United States Patent
Zhang

(10) Patent No.: US 11,977,234 B2
(45) Date of Patent: May 7, 2024

(54) HEAD-MOUNTED DEVICE

(71) Applicant: GUANGDONG OPPO MOBILE TELECOMMUNICATIONS CORP., LTD., Guangdong (CN)

(72) Inventor: Minghao Zhang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 123 days.

(21) Appl. No.: 17/833,428

(22) Filed: Jun. 6, 2022

(65) Prior Publication Data

US 2022/0299777 A1 Sep. 22, 2022

Related U.S. Application Data

(63) Continuation of application No. PCT/CN2020/131233, filed on Nov. 24, 2020.

(30) Foreign Application Priority Data

Dec. 6, 2019 (CN) .......................... 201911244271.0

(51) Int. Cl.
*G02B 27/00* (2006.01)
*G02B 6/10* (2006.01)
(Continued)

(52) U.S. Cl.
CPC ........... *G02B 27/0172* (2013.01); *G02B 6/10* (2013.01); *G02B 27/0176* (2013.01); *G02B 2027/0138* (2013.01); *G06F 3/011* (2013.01)

(58) Field of Classification Search
CPC .. G02B 27/0172; G02B 6/10; G02B 27/0176; G02B 2027/0138; G02B 27/00; G06F 3/011
See application file for complete search history.

(56) References Cited

U.S. PATENT DOCUMENTS

| 2016/0209654 A1* | 7/2016 | Riccomini | ......... G02B 27/0172 |
| 2016/0209655 A1* | 7/2016 | Riccomini | ......... G02B 27/0176 |

(Continued)

FOREIGN PATENT DOCUMENTS

| CN | 205844628 | 12/2016 |
| CN | 107209384 | 9/2017 |

(Continued)

OTHER PUBLICATIONS

EPO, Extended European Search Report for EP Application No. 20896791.9, Jan. 26, 2023.

(Continued)

*Primary Examiner* — Pegeman Karimi

(74) *Attorney, Agent, or Firm* — Hodgson Russ LLP

(57) ABSTRACT

A head-mounted device includes a housing, a mask, and an optical machine assembly. An accommodating chamber is formed in the housing. The upper portion of the mask is connected to the housing, and the lower portion of the mask exceeds out of the housing. The optical machine assembly comprises: an optical machine support arranged in the accommodating chamber; an optical machine, positioned in the accommodating chamber; a waveguide piece; a connecting body, positioned in the accommodating chamber, the optical machine and the waveguide piece being mounted on the connecting body, and the connecting body being fixed to the optical machine support. The waveguide piece penetrates through the bottom of the housing from the accommodating chamber and extends downwards.

19 Claims, 16 Drawing Sheets

(51) Int. Cl.
    *G02B 27/01*    (2006.01)
    *G06F 3/01*    (2006.01)

(56) References Cited

U.S. PATENT DOCUMENTS

2016/0212889 A1*  7/2016  Nikkhoo ............ H05K 7/20963
2018/0259767 A1*  9/2018  Wu .................... G02B 27/0176
2019/0265480 A1   8/2019  Han et al.

FOREIGN PATENT DOCUMENTS

| | | |
|---|---|---|
| CN | 108508605 | 9/2018 |
| CN | 110068929 | 7/2019 |
| CN | 110262039 | 9/2019 |
| CN | 110376745 | 10/2019 |
| CN | 110824715 | 2/2020 |
| CN | 110895370 | 3/2020 |
| WO | 2018222216 | 12/2018 |
| WO | 2019077614 | 4/2019 |

OTHER PUBLICATIONS

CNIPA, First Office Action for CN Application No. 201911244271.0, Mar. 3, 2021.
CNIPA, Notification to Grant Patent Right for Invention for CN Application No. 201911244271.0, Aug. 4, 2021.
WIPO, International Search Report and Written Opinion for PCT/CN2020/131233, Feb. 2, 2021.

* cited by examiner

HEAD-MOUNTED DEVICE

CROSS-REFERENCE TO RELATED APPLICATIONS

The present application is a continuation of International Patent Application No. PCT/CN2020/131233, filed Nov. 24, 2020, which claims priority to Chinese Patent Application No. 201911244271.0, filed Dec. 6, 2019, the entire disclosures of which are incorporated herein by reference.

TECHNICAL FIELD

The present application relates to the technical field of smart devices, and in particular, to a head-mounted device.

BACKGROUND

Virtual reality (VR) and augmented reality (AR) technologies can bring users visual experience that is almost the same as the real scene, and are currently popular research fields. In order to enable users to better experience VR and AR technologies, VR and AR are usually displayed using head-mounted devices.

A head-mounted device is a wearable device that is worn on a user's head. After being worn, a display screen for VR or AR display is located in front of the user's eyes. By displaying corresponding content in regions corresponding to the left eye and the right eye of the wearing user on the display screen of the head-mounted device, it is thus possible to make the user experience display effect of VR or AR.

The head-mounted device may include a host, and the host may mainly include an optical machine assembly, a camera assembly, a motherboard, and the like. These parts of the host may be vulnerable to damage due to dropping or other factors. Therefore, the host needs to be effectively protected within the device.

SUMMARY OF THE DISCLOSURE

One aspect of the present application provides head-mounted device, which includes a housing, a mask, and an optical machine assembly. An accommodating chamber is formed in the housing. An upper portion of the mask is connected to the housing, and a lower portion of the mask exceeds out of the housing. The optical machine assembly includes: an optical machine support arranged in the accommodating chamber; an optical machine positioned in the accommodating chamber; a waveguide piece; and a connecting body positioned in the accommodating chamber, the optical machine and the waveguide piece being mounted on the connecting body, and the connecting body being fixed to the optical machine support. The waveguide piece penetrates through a bottom of the housing from the accommodating chamber and extends downwards.

In another aspect, the present application further provides a head-mounted device, the head-mounted device includes a first housing, a second housing, a mask, and an optical machine assembly. The first housing is provided with a first connecting mechanism, the second housing is provided with a second connecting mechanism engaging with the first connecting mechanism, and the first housing and the second housing are snapped together to form an accommodating chamber. An upper portion of the mask is connected to the first housing, and a lower portion of the mask exceeds out of a bottom of the second housing. The optical machine assembly includes: an optical machine support arranged in the accommodating chamber; an optical machine positioned in the accommodating chamber; a waveguide piece; and a connecting body positioned in the accommodating chamber, the optical machine and the waveguide piece being mounted on the connecting body, and the connecting body being fixed to the optical machine support. The waveguide piece penetrates through the second housing from the accommodating chamber and extends downwards.

In another aspect, the present application further provides a head-mounted device, the head-mounted device includes a housing, a mask, an optical machine, and a waveguide piece. The housing includes: a first housing; and a second housing connected to the first housing by snapping to form an accommodating chamber. An upper portion of the mask is connected to the first housing, and a lower portion of the mask exceeds out of a bottom of the second housing. The optical machine is positioned in the accommodating chamber. The waveguide piece penetrates through the second housing from the accommodating chamber and extends downwards.

BRIEF DESCRIPTION OF THE DRAWINGS

In order to describe technical solutions in embodiments of the present application more clearly, drawings required being used in the embodiments will be simply introduced below. Obviously, the drawings in the following description are merely some embodiments of the present application. For one of ordinary skill in the art, it is also possible to acquire other drawings according to these drawings without paying any creative work.

DETAILED DESCRIPTION

Technical solutions in embodiments of the present application will be clearly and completely described below in conjunction with the accompanying drawings in the embodiments of the present application. Obviously, the described embodiments are only some embodiments of the present application, but not all embodiments. Based on the embodiments in the present application, all other embodiments obtained by those skilled in the art without making creative work fall within the protection scope of the present application.

Mentioning "embodiments" herein means that a specific feature, structure, or characteristic described in conjunction with the embodiments may be included in at least one embodiment of the present application. The appearance of the phrase in various places in the specification does not necessarily refer to the same embodiment, nor is it an independent or alternative embodiment mutually exclusive with other embodiments. Those skilled in the art clearly and implicitly understand that the embodiments described herein can be combined with other embodiments.

It is to be noted that the terms "first", "second", etc. in this article are only intended for descriptive purposes and cannot be understood as indicating or implying relative importance or implicitly indicating the number of indicated technical features. Therefore, the features defined with "first" and "second" may explicitly or implicitly include one or more of the features.

Figure 1:
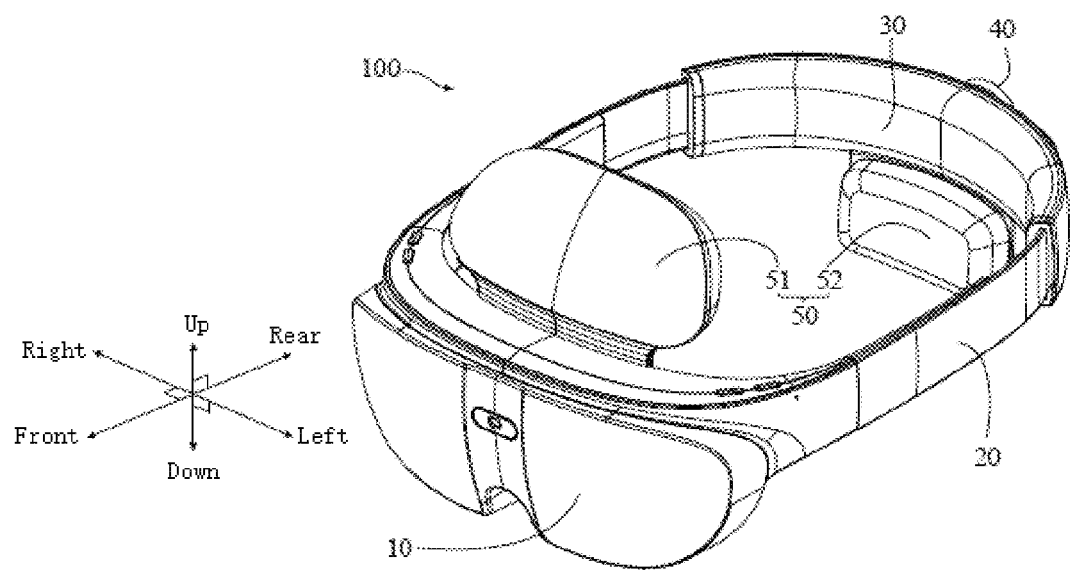
FIG. 1 is a perspective assembled view of a head-mounted device of an embodiment of the present application.

As shown in FIG. 1, a head-mounted device 100 of an embodiment of the present application can include a first housing assembly 10, a strap assembly 20 connected to two ends of the first housing assembly 10, a tightness adjustment mechanism 40 connected to the strap assembly 20, a second housing assembly 30 arranged on the strap assembly 20 and opposite to the first housing assembly 10, and a force receiving assembly 50 arranged on the first housing assembly 10 and the second housing assembly 30. Among them, the first housing assembly 10, the strap assembly 20, and the second housing assembly 30 can form a frame with adjustable tightness, so as to facilitate wearing the head-mounted device 100 on a user's head. The force receiving assembly 50 is arranged on upper and lower sides of the frame to share the weight of the head-mounted device 100 born by the user's head.

Figure 2:
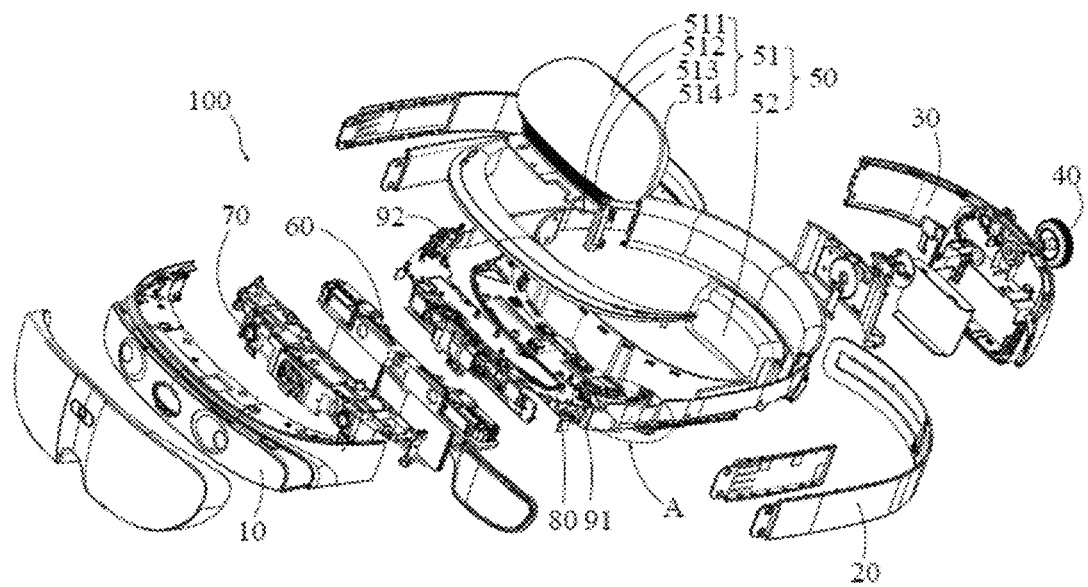
FIG. 2 is a perspective disassembled view of the head-mounted device in FIG. 1.
Figure 3:
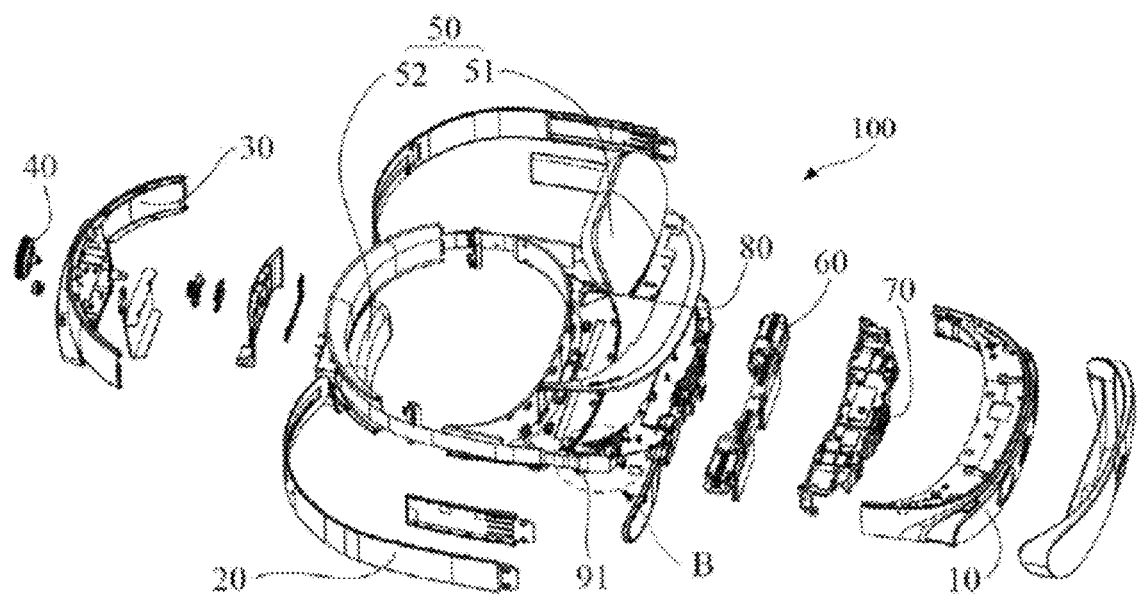
FIG. 3 is a perspective disassembled view in another view angle of the head-mounted device in FIG. 1.

Further in combination with FIG. 2 and FIG. 3, the head-mounted device 100 can further include a host received in the first housing assembly 10, the host may include an optical machine assembly 60, a camera assembly 70, a motherboard 80, a speaker assembly 91, a microphone assembly 92, etc. Since the first housing assembly 10 is configured to receive and protect the host, the first housing assembly 10 may also be referred to as a host housing, a protective housing, or directly referred to as a housing. The first housing assembly 10 and the host received therein may constitute a host assembly. The head-mounted device 100 may be VR glasses, AR glasses, or the like. In embodiments of the present application, AR glasses are taken as an example for description.

In the example of AR glasses, the head-mounted device 100 may be configured to transmit data to and receive data from an external processing device through a signal connection, and the signal connection may be a wired connection, a wireless connection, or a combination thereof. However, in other situations, the head-mounted device 100 may be configured as a stand-alone device, that is, data processing is performed on the head-mounted device 100 itself. The signal connection may be configured to carry any kind of data, such as image data (e.g., still images and/or full motion video, including 2D and 3D images), audio, multimedia, voice, and/or any other type of data. The external processing device may be, for example, a game console, a personal computer, a tablet computer, a smart phone, or other types of processing devices. The signal connection may be, for example, a universal serial bus (USB) connection, a Wi-Fi connection, a Bluetooth or Bluetooth low energy (BLE) connection, an Ethernet connection, a cable connection, a DSL connection, a cellular connection (e.g., 3G, LTE/4G or 5G) etc., or a combination thereof. Additionally, the external processing device may communicate with one or more other external processing devices via a network. The network may be or include, for example, a local area network (LAN), a wide area network (WAN), an intranet, a metropolitan area network (MAN), the global Internet, or a combination thereof.

The first housing assembly 10 of the head-mounted device 100 may be provided with a display assembly, an optical device, a sensor, a processor, etc. In the example of AR glasses, the display assembly is designed to, for example, overlay an image on a user's view of a real-world environment by projecting light into the user's eyes. The head-mounted device 100 may further include an environmental light sensor, and may further include an electronic circuit system to control at least some of the aforementioned components and perform associated data processing functions. The electronic circuit system may include, for example, one or more processors and one or more memories.

Figure 4:
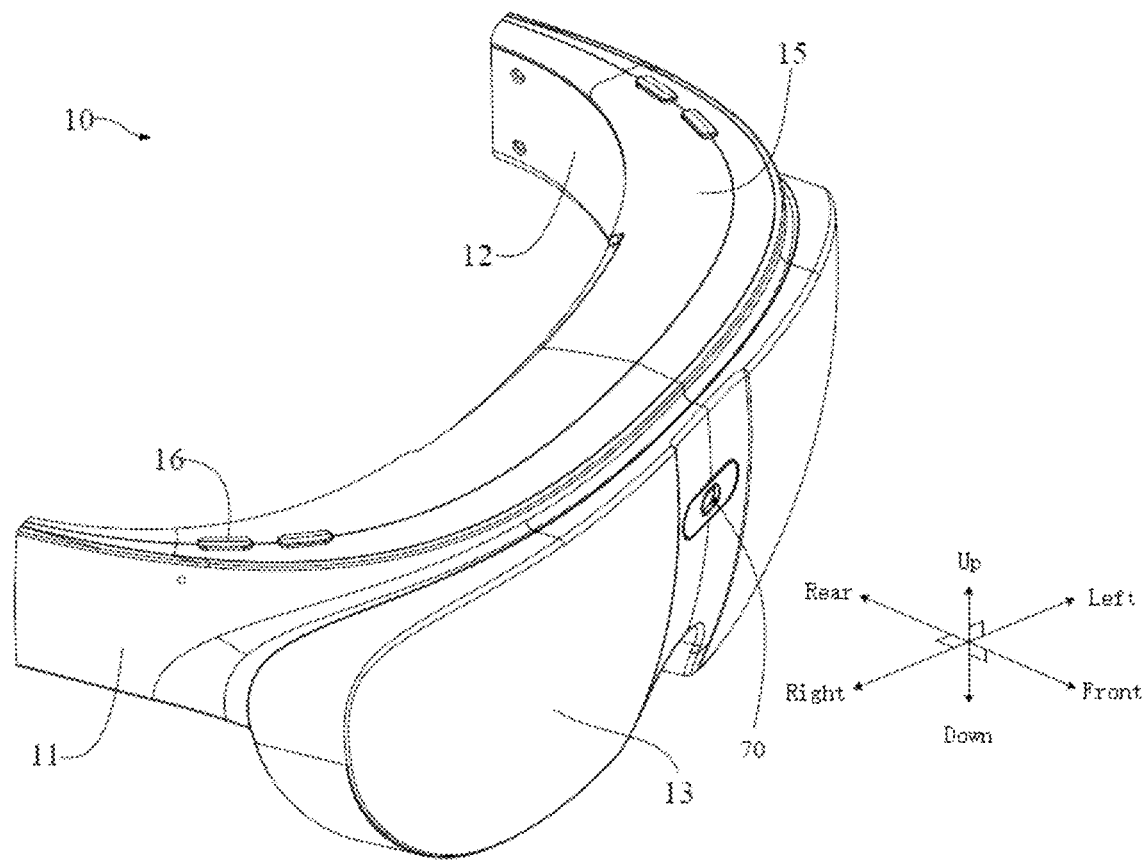
FIG. 4 is a perspective assembled view of a first housing assembly of a head-mounted device of an embodiment of the present application.
Figure 5:
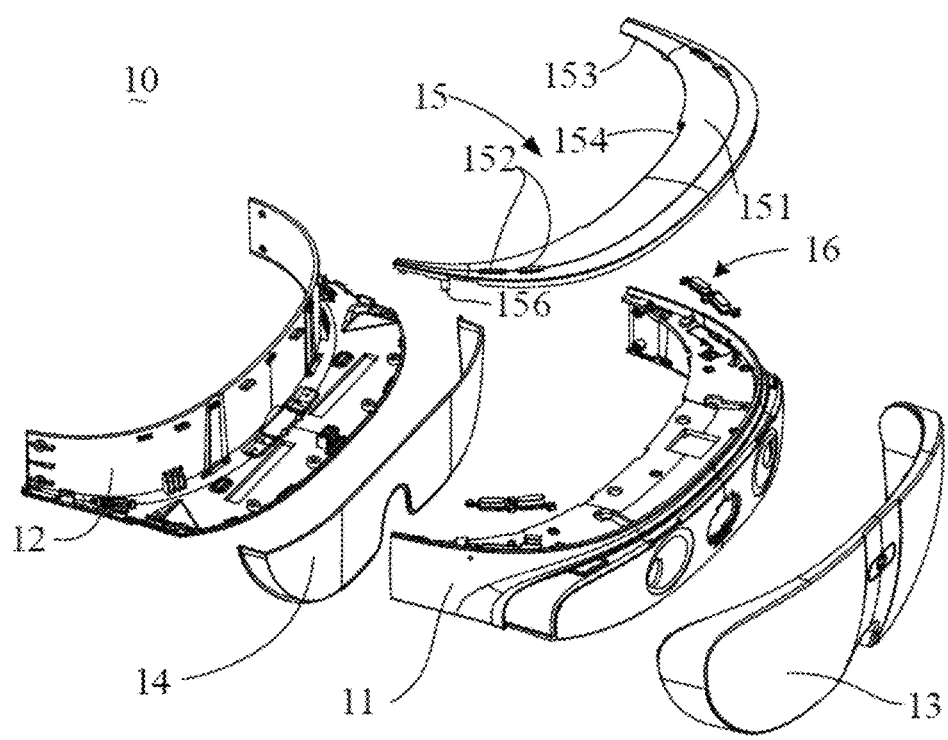
FIG. 5 is a perspective disassembled view of the first housing assembly in FIG. 4.

As shown in FIG. 4 and FIG. 5, a perspective assembled view and a disassembled view of the first housing assembly 10 of the head-mounted device 100 of the embodiment of the present application are respectively illustrated. The first housing assembly 10 can include a main front casing 11, a main rear casing 12 matching with the main front casing 11 by snapped connection, a mask 13 covering the front of the main front casing 11, a rear cover 14 located below the main rear casing 12 and matching with a lower portion of the mask 13, and a main casing decorating element 15 covering a top of the main front casing 11.

In this specification, orientations such as "up", "down", "front", "rear", "left" and "right" as shown in FIG. 1 and FIG. 4 will be referred to for description. It should be appreciated that, in the present application, directions or position relationships indicated by the terms "middle", "longitudinal", "transverse", "length", "width", "thickness", "up", "down", "front", "rear", "left", "right", "vertical", "horizontal", "top", "bottom", "inner", "outer", "clockwise", "counter-clockwise", "axial", "radial", "circumferential" and others are directions or position relationships based on the shown in the drawings, and are only for convenience of describing the present application and simplification of the description, rather than indicating or implying that an indicated apparatus or component must have a specific orientation or be constructed and operated in the specific orientation, therefore cannot be construed as any restriction on the present application.

Figure 6:
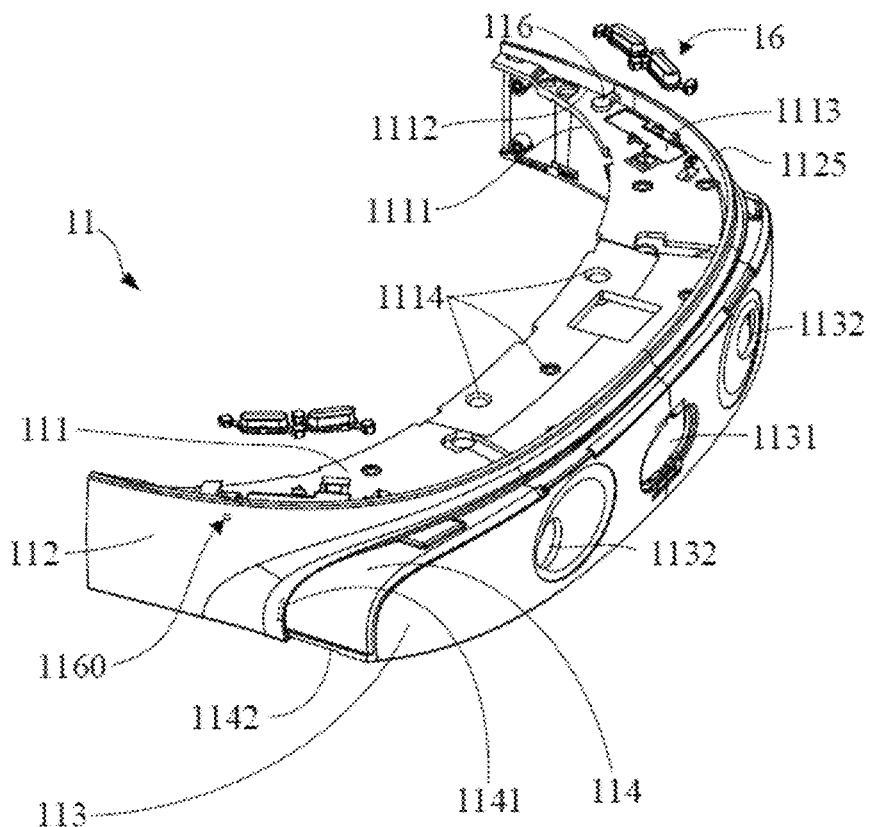
FIG. 6 is a perspective enlarged view of a main front casing of the first housing assembly in FIG. 5.
Figure 8:
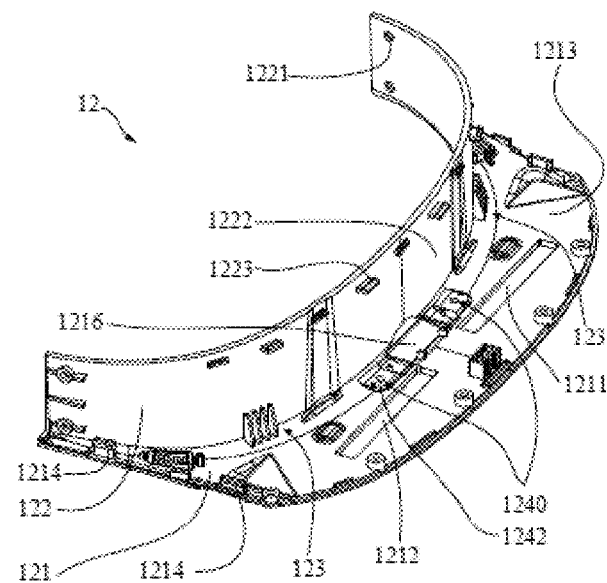
FIG. 8 is a perspective enlarged view of a main rear casing of the first housing assembly in FIG. 5.

As shown in FIG. 6, the main front casing 11 can include a top plate 111 and a first side plate provided on one side of the top plate 111. The first side plate may include a first portion 112 provided on an outer side surface of the top plate 111 and extending downward from two sides of the top plate 111, a second portion 113, and a connection portion 114 extending from the first portion 112 and away from a mounting plate 122 (as shown in FIG. 8) of the main rear casing 12. The second portion 113 extends downward from the connection portion 114. A cross section of the main front casing 11 may be approximately of an inverted L-shape. The main front casing 11 may be a one-piece injection molded member, so as to increase a structure strength of the main front casing 11.

Figure 7:
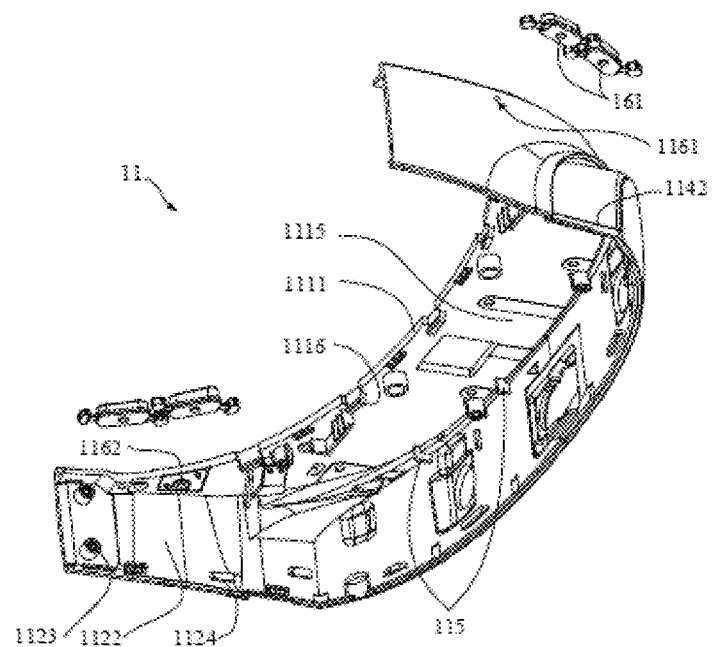
FIG. 7 is a perspective view in another view angle of the main front casing in FIG. 6.
Figure 18:
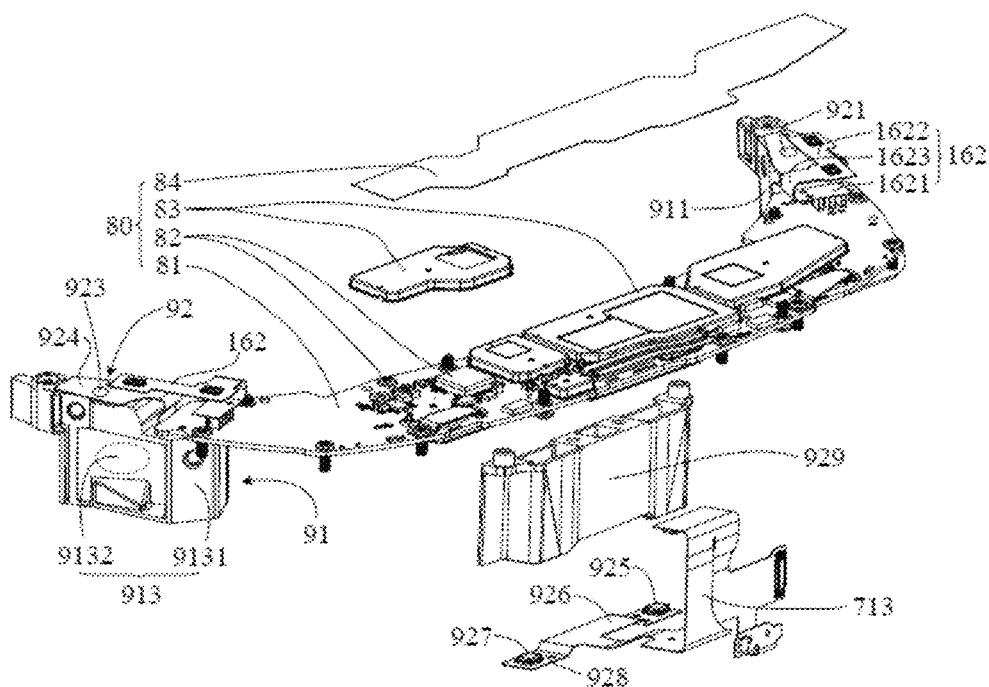
FIG. 18 is a perspective disassembled view of a motherboard, a speaker assembly, and a microphone assembly of a head-mounted device of an embodiment of the present application.

The top plate 111 may as a whole be crescent-shaped. That is, an inner side surface 1111 of the top plate 111 may be of an arc shape approximately matching a forehead profile of a user. An outer side surface 1112 of the top plate 111 may also be of an arc shape of which a curved extent is greater than the that of inner side surface 1111, and two ends of the inner side surface 1111 and two ends of the outer side surface 1112 may approach each other respectively, in other words, a distance between the inner side surface 1111 and the outer side surface 1112 decreases gradually from a middle of the top plate 111 to left and right sides of the top plate 111. The top plate 111 may be arranged horizontally, and one or more accommodating parts 1113 may be defined on two sides of the top plate 111. For example, an accommodating part 1113 may be defined at the left-front of the top plate 111, and an accommodating part 1113 may be defined at the right-front of the top plate 111. The accommodating part 1113 may be a recess for accommodating a key segment 1622 of a key FPC (Flexible Printed Circuit, which is collectively referred to as FPC herein) 162 (as shown in FIG. 18). The accommodating part 1113 may also partially accommodate a bottom part of a side key 16. When the side key 16 is pressed, a protruding post 161 (as shown in FIG. 7) below the side key 16 is used to press this key segment 1622. In one embodiment, four side keys 16 may be symmetrically arranged on the top plate 111 at positions away from its middle position and near its left and right sides, that is, with two side keys 16 on each side. The top plate 111 may also define one or more through holes 1114 configured for assembly with other components. Among them, some of the through holes 1114 can be provided therein with threads for matching with screws; while other through holes 1114 may be provided with no thread and merely configured for passing of screws. In combination with FIG. 7, a lower surface 1115 of the top plate 111 may also be provided with one or more snap structures 1116 near the inner side surface 1111. In one embodiment, each snap structure 1116 is a snap-hook. It should be appreciated that, the snap structures in the present application are not limited to snap-hooks, bumps, slots, recesses, through holes etc., as long as they can enable two structures to snap with each other.

It should be noted that, in the description of the present application, unless otherwise definitely specified and limited, the terms "mount", "join", "connect" should be understood in a broad sense, for example, may be fixed connections, and may also be detachable connections or integrally connections; may be mechanical connections, and may also be electrical connection; may be direct connections, and may also be indirect connections through intermediate media; and may also be internal communication between two components. For those of ordinary skills in the art, specific meanings of the above-mentioned terms in the present application can be understood according to specific circumstances.

The first portion 112 extends downward from two sides of the outer side surface 1112 of the top plate 111, that is, corresponds to positions of left and right sides of a user's eyes, such that a top view profile of the first portion 112 is the same arc-shape as that of the outer side surface 1112. The first portion 112 and the second portion 113 are symmetrically arranged on two sides of the top plate 111. One or more channels 1160 for sound input may be defined at two sides of the first portion 112. For example, a channel 1160 may be defined at a left-front position of the first portion 112, and a channel 1160 may be defined at a right-front position of the first portion 112. Each of the channels 1160 may be defined within a bump 116. An inlet 1161 of the channel 1160 is located on at outer surface of the first portion 112 of the first side plate. For example, the inlets 1161 of two channels 1160 may located at an upper half part of the first portion 112 of the first side plate. Exits 1162 of the channels 1160 are located at a lower surface 1115 of the top plate 111. Each of the channels 1160 may be located at a rearward position of the accommodating part 1113. The inlets 1161 of the two channels 1160 are located at sides of the housing 10 and have opposite orientations. These channels 1160 may also be referred to as microphone holes, and configured to transmit sound into the microphone assembly 92 (as shown in FIG. 18) in the head-mounted device 100. Sound data of the user and/or the external environment may then be collected by the microphone assembly 92. Left and right ends of an inner surface 1122 of the first portion 112 of the first side plate may be provided with one or more tabs 1123 configured to be connected with the strap assembly 20. In the assembly structure of the main front casing 11 and the main rear casing 12, the tabs 1123 are further located between the first portion 112 and the mounting plate 122. A threaded hole may be defined in the tab 1123 to screw in a screw. One or more snap structures 1124 may also be provided at a lower edge of the inner surface 1122 of the first portion 112. The first portion 112 may further extend upward from the outer side surface 1112 of the top plate 111 to form a convex ridge portion 1125 of which a shape matches with that of the outer side surface 1112. The upward extending direction is a direction extending from the top plate 111 away from the bottom plate 121 (as shown in FIG. 8). A height of the convex ridge portion 1125 may be comparable to a thickness of the main casing decorating element 15, such that the main casing decorating element 15 may be placed within a space defined by the top plate 111 and the convex ridge portion 1125, and a rear-facing side surface of the convex ridge portion 1125 is enabled to be in contact with a forward-facing side surface of the main casing decorating element 15. The convex ridge portion 1125 may also be arranged to surround the periphery of the main casing decorating element 15. The connection portion 114 extends forwards from the first portion 112, that is, extends along a direction away from the tab 1123. A step is formed on the connection portion 114, and one or more snap structures 1141 may be provided on the step. In one embodiment, each snap structure 1141 is a recess. The snap structures 1141 may also be bumps, snap-hooks, slots, etc. Two sides of the connection portion 114 may be provided with guiding structures 1142, such as horizontally extending bosses. These guiding structures 1142 and snap structures 1141 are configured to fit and connect with the mask 13.

As shown in FIG. 6 and FIG. 7, the second portion 113 is provided on the front side of the top plate 111, corresponds to positions of a user's eyes, and is connected to a front end of the connection portion 114. A width of a middle part of the second portion 113 along an up-down direction may be greater than widths at two side parts connecting with the connection portion 114. The second portion 113 can define a middle through hole 1131 and two through holes 1132 located at two sides of the through hole 1131, which are configured for passage of external light received by the camera.

As shown in FIG. 7, one or more reinforcing ribs 115 may also be provided at a connection part between the top plate 111 and the second portion 113, thereby enhancing the connection between the second portion 113 and the top plate 111.

Figure 9:
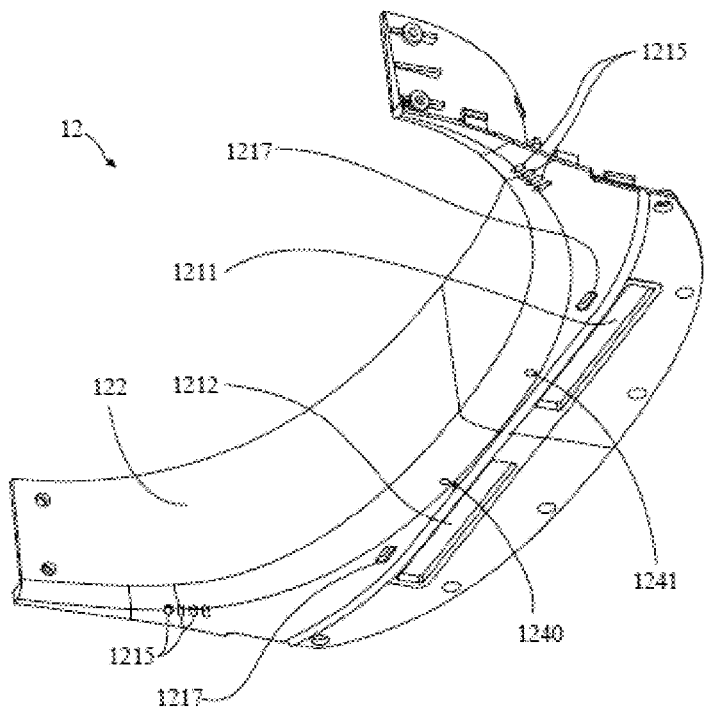
FIG. 9 is a perspective view in another view angle of the main rear casing in FIG. 8.
Figure 22:
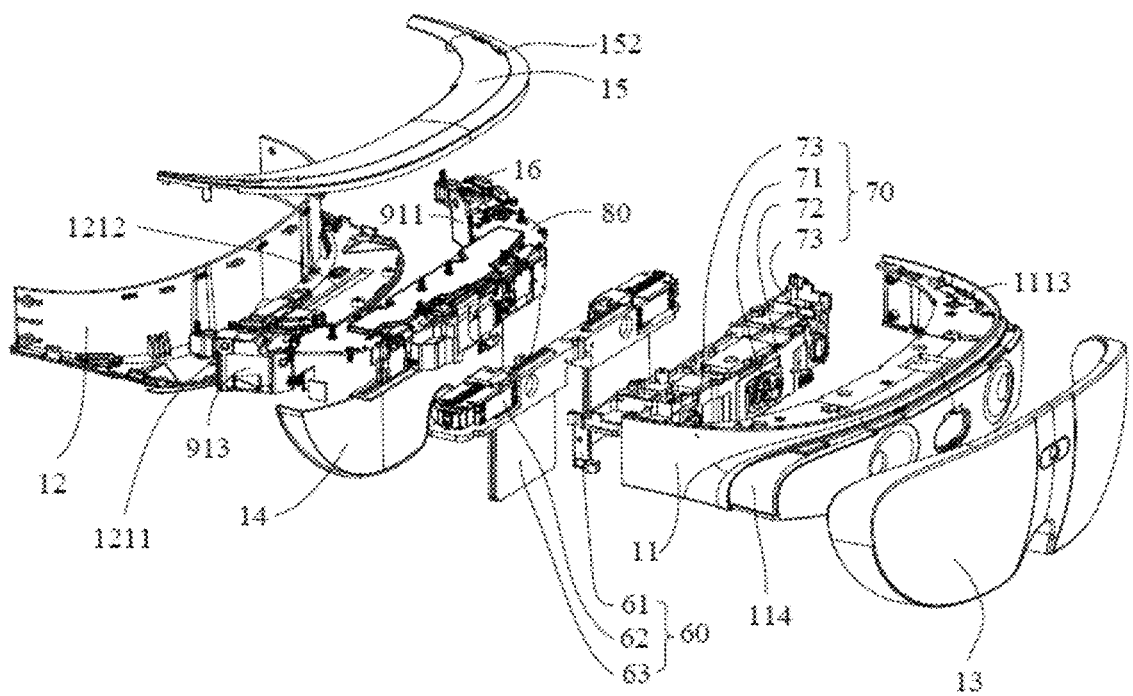
FIG. 22 is a perspective disassembled view of the first housing assembly, the optical machine assembly, the camera assembly, the speaker, and the motherboard of the head-mounted device in FIG. 1.

As shown in FIG. 8 and FIG. 9, the main rear casing 12 may include a bottom plate 121 corresponding to the top plate 111 of the main front casing 11 along an up-down direction and a mounting plate 122 corresponding to the first side plate of the main front casing 11 along a front-rear direction. The mounting plate 122 may also be referred as a second side plate. A cross section of the main rear casing 12 may be approximately of an L-shape, which fits with the inverted L-shape of the main front casing 11 to exactly form an accommodation cavity 17 (as shown in FIG. 22). The main rear casing 12 may be a one-piece injection molded member, so as to increase the structure strength of the main rear casing 12. One or more reinforcing ribs 123 may also be provided at a connection between the bottom plate 121 and the mounting plate 122, thereby enhancing the connection between the bottom plate 121 and the mounting plate 122.

Figure 14:
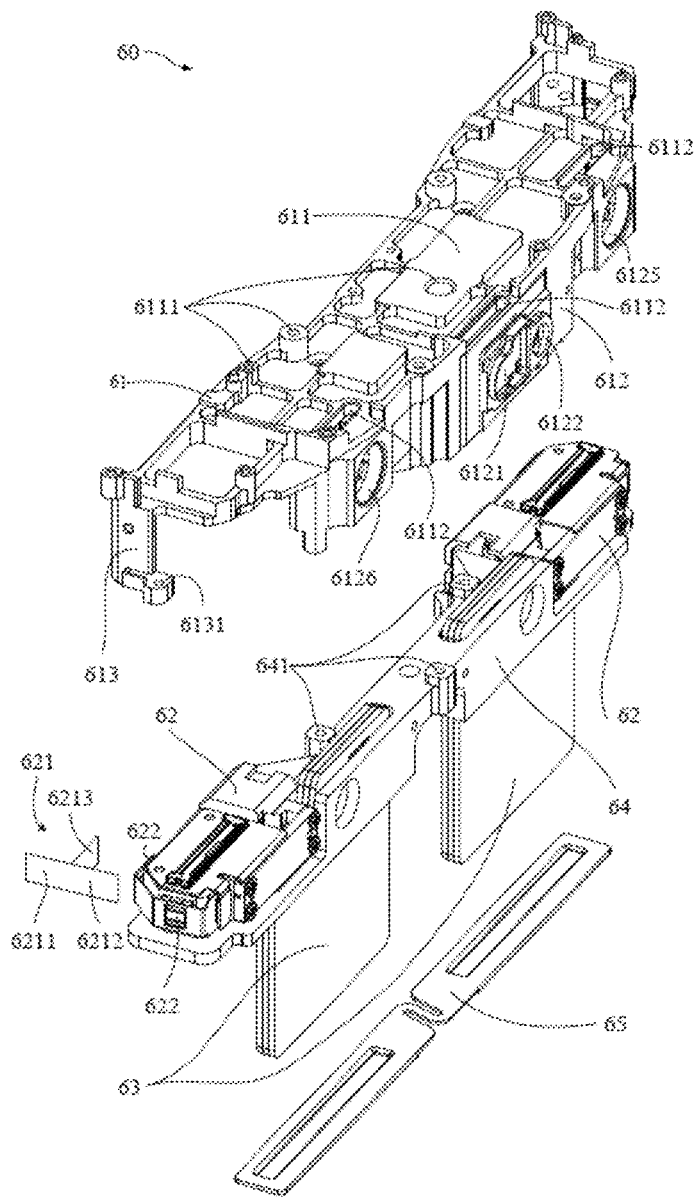
FIG. 14 is a perspective disassembled schematic view of an optical machine assembly in FIG. 2.

The bottom plate 121 may be in a crescent shape that is substantially the same as that of the top plate 111. Two rectangular through holes 1211, 1212 may be left-right symmetrically defined at the bottom plate 121, and are configured for a waveguide piece 63 of the optical machine assembly 60 (as shown in FIG. 14) to be inserted therethrough from above. An edge of the upper surface 1213 of the bottom plate 121 distancing from the mounting plate 122 is further provided with one or more snap structures 1214 so as to match with the snap structures 1124 of the first portion 112 of the main front casing 11. One or more speaker sound output hole 1215 may be defined in a middle part of each of two sides of the bottom plate 121, that is, a first group of speaker sound output holes consisting of one or more speaker sound output holes 1215 may be defined at the middle part of one side of the bottom plate 121, and a second group of speaker sound output holes consisting of one or more speaker sound output holes 1215 may be defined at the middle part of the other side of the bottom plate 121. When the head-mounted device 100 is worn by a user, the speaker sound output holes 1215 may be close to the user's ears, so that the user may be enabled to conveniently hear sound played by speakers arranged in the head-mounted device 100. A first magnet 1216 may be further provided in a middle part the bottom plate 121 near the mounting plate 122. Two recesses 1217 may be further defined at two sides of the lower surface of the bottom plate 121 distancing from the top plate 111, which correspond to the first magnet 1216. The two recesses 1217 are located at a side of the rear cover 14 distancing from the mask 13. The above-mentioned first and second groups of speaker sound output holes may be respectively located at two sides of the two recesses 1217, and the first and second groups of speaker sound output holes are farther away from the rear cover 14 than the two recesses 1217.

One or more channels 1240 for sound input may be further defined in the bottom plate 121. These channels 1240 may be defined at positions that are in the middle of the bottom plate 121 and close to the mounting plate 122. For example, a channel 1240 may be defined at a position on a left side of the first magnet 1216, and another channel 1240 may be defined at a position on a right side of the first magnet 1216. An inlet 1241 of each channel 1240 is located at the lower surface of the bottom plate 121, that is, located at the bottom surface of the housing 10. The inlets 1241 of both the two channels 1240 may be adjacent to the mounting plate 122. An exit 1242 of each channel 1240 is located at an upper surface 1213 of the bottom plate 121. These channels 1240 may be referred to as microphone holes, which are configured to transmit sound into the microphone assembly 92 (as shown in FIG. 18) arranged in the head-mounted device 100. Sound data of the user and/or the external environment may then be collected by the microphone assembly 92.

In one embodiment, a distance between two channels 1160 is greater than a distance between the two channels 1240. Further, a distance between one of the channels 1160 and one of the channels 1240 being adjacent thereto is equal to a distance between the other of the channels 1160 and the other of the channels 1240 being adjacent thereto.

The mounting plate 122 extends upward from the bottom plate 121. The mounting plate 122 may be of an arc shape approximately matching with a user's forehead profile. A through hole 1221 is defined in each of two sides of the mounting plate 122 for a screw to pass through. One or more snap structures 1223 may be provided at an upper edge of the outer side surface 1222 of the mounting plate 122. In one embodiment, each of the snap structures 1223 is a snap-hook, so as to match with the snap structure 1116, such as a snap-hook, of the top plate 111 of the main front casing 11.

The snap structures 1116 and the snap structures 1223 can constitute a first connection mechanism arranged between the top plate 111 and the mounting plate 122. The snap structures 1124 and the snap structures 1214 can constitute a second connection mechanism arranged between the bottom plate 121 and the first side plate. The first connection mechanism and the second connection mechanism enable the main front casing 11 and the main rear casing 12 to match with each other and thereby form the accommodation cavity 17 configured to receive the host of the head-mounted device 100. In other embodiments, the first connection mechanism may be a threaded connection structure or a bonding structure, and the second connection mechanism may be a threaded connection structure or a bonding structure.

It should be noted that, when the first housing assembly 10 is described alone (that is, when it is not described in conjunction with the second housing assembly 30), the main front casing 11 may also be referred to as a first housing, and the main rear casing 12 may also be referred to as a second housing.

Figure 10:
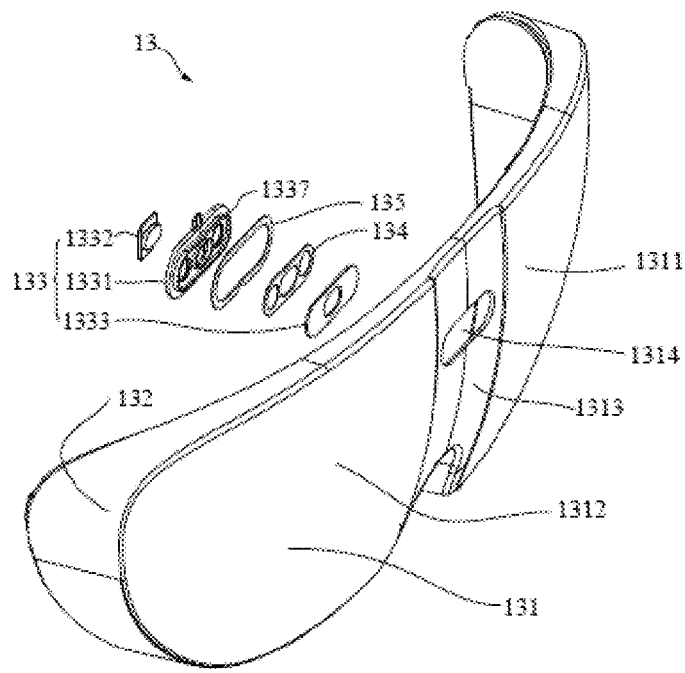
FIG. 10 is a perspective enlarged view of a mask of the first housing assembly in FIG. 5.
Figure 11:
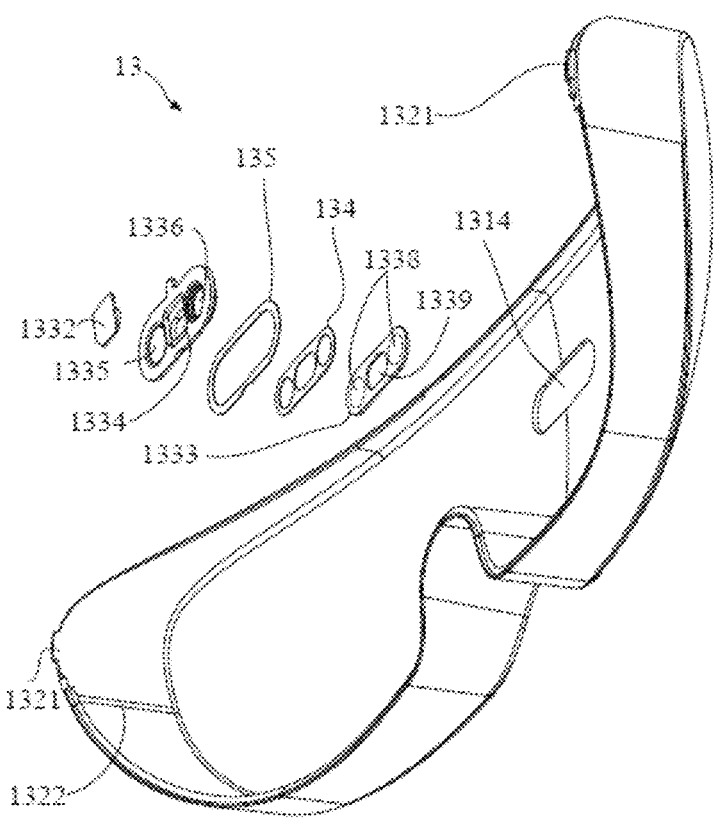
FIG. 11 is a schematic view in another view angle of the mask in FIG. 10.

As shown in FIG. 10 and FIG. 11, the mask 13 may be translucent, and may include a mask portion 131, a mounting portion 132, and a lens assembly 133. The mask portion 131 may include a first mask portion 1311 and a second mask portion 1312 which are symmetrical along a left-right direction, and a connection portion 1313 arranged between the first mask portion 1311 and the second mask portion 1312.

The first mask portion 1311 and the second mask portion 1312 have transmittance in optical properties, and meet light transmittance property at least at two through holes 1132 corresponding to the second portion 113 of the main front casing 11 so as to achieve the following effect: external light can pass through the first mask portion 1311 and the second mask portion 1312, while objects inside the mask 13 cannot be seen by human eyes from outside. For example, the mask 13 may be treated to degrade its light-transmission capacity, thereby achieving translucent effect. In this way, structures inside the mask 13 cannot be seen by human eyes, but the camera assembly 70 within the mask 13 can receive external light, and thus can image outside objects. Materials of the mask 13 may include plastics, metals, etc.

A through hole 1314 is defined at a part of the connection portion 1313 corresponding to the through hole 1131 of the second portion 113. The mounting portion 132 extends rearward from an edge of the mask portion 131, that is, extends toward the main front casing 11. One or more snap structures 1321, such as snap-hooks or bosses may be provided at an edge of the mounting portion 132 distancing from the mask portion 131. One or more guiding structures 1322, such as horizontally extending bosses or steps, may be arranged on inner surfaces of two sides of the mounting portion 132. These snap structures 1321 and guiding structures 1322 are respectively configured to match and connect with the snap structures 1141 and the guiding structures 1142 of the connection portion 114 of the main front casing 11, so that the mask 13 is mounted to the main front casing 11, for example, the first mounting portion 132 is attached and connected to the connection portion 114 of the first side plate. When viewed from the front of the mask 13, a covering area of the mask 13 is greater than a covering area of the main front casing 11. In this way, when the mask 13 is mounted to the main front casing 11, only an upper part of the mask 13 is attached and connected to the first side plate of the main front casing 11 and covers the first side plate (for example, an upper part of the mask portion 131 covers the second portion 113 of the first side plate), while a lower part of the mask 13 is lower than the main front casing 11, that is, extends downward and beyond the main front casing 11 (as shown in FIG. 4), and further beyond the bottom plate 121 correspondingly. The rear cover 14 and a lower part of the mask 13 are configured to form a protection space therebetween, so as to protect the waveguide sheet 63 therebetween. The upper part of the mask 13 may be an upper half of the mask 13, and the lower part of the mask 13 may be a lower half of the mask 13.

The snap structures 1321 of the mask 13 and the snap structures 1141 of the connection portion 114 can form a connection structure between an edge of the first mounting portion 132 distancing from the mask portion 131 and the connection portion 114. The snap structures 1321 are snap-connected with the snap structures 1141. The guiding structures 1322 of the mask 13 and the guiding structures 1142 of the connection portion 114 can form a guiding structure between a surface of the first mounting portion 132 facing the connection portion 114 and the connection portion 114. The guiding structures 1322 slidingly matches with the guiding structures 1142.

The lens assembly 133 may be inserted in the through hole 1314. The lens assembly 133 may include a lens bracket 1331, and a first lens 1332 and a second lens 1333 mounted on the lens bracket 1331. The lens bracket 1331 may define a first through hole 1334, a second through hole 1335 and a third through hole 1336. The first through hole 1334 may be defined in the middle, and the second through hole 1335 and the third through hole 1336 may be respectively located at two sides of the first through hole 1334. This first lens 1332 may be inserted into the first through hole 1334 from the rear and fixed therein. The second lens 1333 may include two lens parts 1338 corresponding to the second through hole 1335 and the third through hole 1336 respectively, and define a through hole 1339 located between the two lens parts 1338. The second lens 1333 may be combined to a front surface of the lens bracket 1331 by a bonding member 134. The front surface of the lens bracket 1331 may be further provided with an annular flange 1337 surrounding the first through hole 1334, the second through hole 1335, and the third through hole 1336. A protruding length of the annular flange 1337 may be equal to a thickness of the second lens 1333, such that the second lens 1333 may be received in a space defined by the annular flange 1337. The lens bracket 1331 may be combined to a rear surface of the connection portion 1313 through a bonding member 135, and the annular flange 1337 may be inserted in the through hole 1314. The bonding member 134 and the bonding member 135 may be double-sided adhesives or the like.

In the assembled lens assembly 133, the first lens 1332 is inserted in the first through hole 1334 and corresponds to the through hole 1339. The two lens parts 1338 correspond to the second through hole 1335 and the third through hole 1336 respectively.

Figure 12:
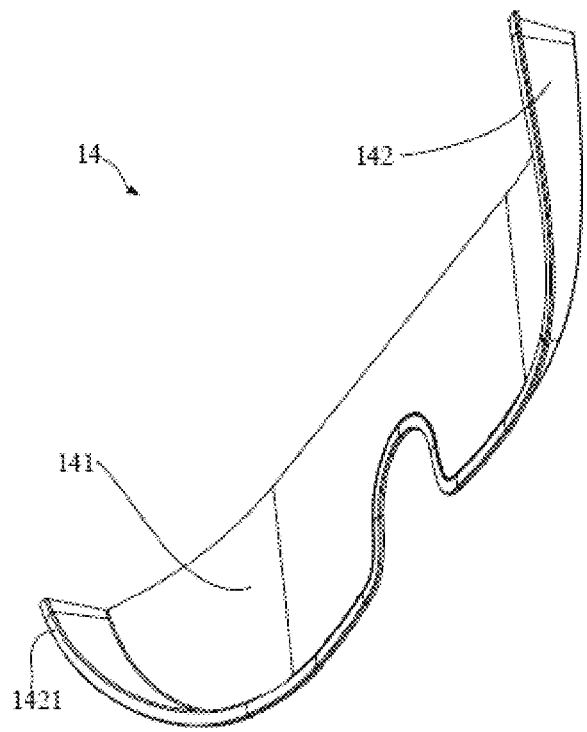
FIG. 12 is an enlarged schematic view of a rear cover of the first housing assembly in FIG. 5.

As shown in FIG. 12, the rear cover 14 may be transparent, and may include a light-transmitting portion 141 and a mounting portion 142. The light-transmitting portion 141 has light-transmittance performance by be setting optical characteristics, so that light emitted from the optical machine assembly 60 may transmit through the light-transmitting portion 141 and enter eyes of the user. The light-transmitting portion 141 may be arranged to be substantially parallel to the mask portion 131 of the mask 13. The mounting portion 142 extends rearward from edges of the light-transmitting portion 141 except an upper edge, that is, the extends along a direction away from the mask 13, and an edge of the mounting portion 142 distancing from the light-transmitting portion 141 forms a flange 1421 outwards. As also shown in FIG. 5, the rear cover 14 may match with and be assembled to the lower part of the mask 13, and may be located below the bottom plate 121 correspondingly; wherein the rear cover 14 may approach toward the mask 13, so that the light-transmitting portion 141 and the mounting portion 142 are inserted into the lower part of the mask 13, until the flange 1421 abuts against an end face of the mounting portion 132 of the mask 13 (as further shown in FIG. 20). A part of the rear cover 14 that contacts with the mask 13 and the main front casing 11 may be further coated with adhesive to enhance the connection. Since the waveguide sheet 63 (as shown in FIG. 14) of the optical machine assembly 60 usually includes glass material, which is fragile, the waveguide sheet 63 is protected from both an outside and an inside by the mask 13 and the rear cover 14, such that safety is high and it is avoided that the glass material is accidentally broken and hurts the user's eyes. In addition, the rear cover 14 may be fully transparent, of which a light-transmissible capacity is higher than that of normal transparent materials, so that the user can clearly see pictures displayed by the waveguide sheet 63 when wearing the head-mounted device 100.

Figure 13:
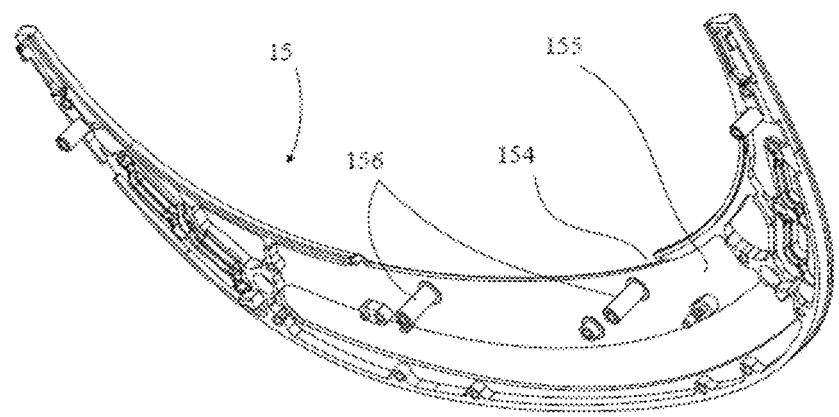
FIG. 13 is a schematic view in another view angle of a main casing decorating element in FIG. 5.

As shown in FIG. 13, the main casing decorating element 15 may as a whole be crescent-shaped, its top surface 151 may be arranged to be streamlined or smooth etc., so as to increase the aesthetic property of the product appearance. The main casing decorating element 15 may be arranged on the top plate 111 to cover the top plate 111, that is, covers a top part of the main front casing 11. Therefore, the main casing decorating element 15 may also be referred to as a cover plate; moreover, arc shapes of two opposite side surfaces of the cover plate 15 are respectively similar to the arc shape of the inner side surface 1111 of the top plate 111 and the arc shape of the outer side surface 1112 of the top plate 111. As shown in FIG. 5, one or more key holes 152 may be defined at two sides of the main casing decorating element 15, the number of the key holes 152 is equal to the number of the side keys 16. For example, two key holes 152 are defined at a front-left part of the main casing decorating element 15, and two key holes 152 are defined at a front-right part of the main casing decorating element 15. These key holes 152 are arranged to be in up-down correspondence with the accommodating parts 1113 defined on the top plate 111 of the main front casing 11. The four side keys 16 are respectively arranged above the accommodating parts 1113 of the top plate 111, and pass through the key holes 152 of the main casing decorating element 15 to partially protrude from the main casing decorating element 15, thereby allowing users to perform pressing operations on the side keys 16 and then adjust various parameters of the head-mounted device 100. Since the four side keys 16 are generally located at front-left or front-right parts of the first housing assembly 10, it is convenient for users to operate and use. A middle part of the inner side surface 153 of the main casing decorating element 15 further forms a recess 154. One or more posts 156 protrude downward from the lower surface 155 of the main casing decorating element 15, and these posts 156 may have threaded holes. As illustrated above, the main casing decorating element 15 is configured to be placed in the space defined by the top plate 111 and the convex ridge portion 1125 of the main front casing 11, wherein the posts 156 of the main casing decorating element 15 can run through one of the through holes 1114 of the top plate 111 to be fixed to the top plate 111 of the main front casing 11.

Also as shown in FIGS. 4 and 5, when the first housing assembly 10 is assembled, the main front casing 11 and the main rear casing 12 are assembled together by engagement between the snap structures 1124, the snap structures 1116 and the snap structures 1214, the snap structures 1223. The mask 13 can cover on the front of the main front casing 11 by engagement between the snap structures 1321 and the snap structures 1141. The rear cover 14 can approach toward the mask 13 and be inserted into the lower part of the mask 13. The main casing decorating element 15 is then mounted to cover the top part of the main front casing 11.

As shown in FIG. 14, a perspective view of the optical machine assembly 60 of the head-mounted device 100 in an embodiment of the present application is illustrated. The optical machine assembly 60 can include an optical machine support 61, an optical machine 62, and a waveguide sheet 63.

The optical machine support 61 can include a top plate 611, a side plate 612 extending from a side of the top plate 611, and two legs 613 extending from the top plate 611 located at two sides of the top plate 611 and the side plate 612.

The top plate 611 may be arranged horizontally. It should be noted that, the top plate 611 is not necessarily arranged to be a continuous and leveling flat plate shape; it may define recesses at one or more parts so as to reduce a structural weight at the same time of meeting a supporting strength. The top plate 611 can define one or more through holes 6111 configured for mounting other components. These through holes 6111 may have threads therein or have no thread. A front part of the top plate 611 can further define one or more long strip-shaped through holes 6112 for allowing an FPC to pass through. The side plate 612 extends downward from a front edge of the top plate 611, and the two legs 613 are respectively located at left and right sides of the top plate 611 and extend downward. A middle part of the side plate 612 defines a through hole 6121 and a through hole 6122, and each of two sides of the middle part of the side plate 612 defines a through hole, that is, a through hole 6125 and through hole 6126; these through holes 6121, 6122, 6125 and 6126 may be configured to receive the camera assembly 70. The through hole 6121 and the through hole 6122 are arranged adjacently, a distance between the through hole 6121 and the through hole 6126 may be equal to a distance between the through hole 6122 and the through hole 6125. The through hole 6121 and the through hole 6122 overall correspond to the middle through hole 1131 defined in the center of the second portion 113 of the main front casing 11. The through hole 6125 and the through hole 6126 correspond to the two through holes 1132 defined in the second portion 113 of the main front casing 11 respectively. The through holes 1131 and 1132 are configured for allowing external light that is to be received by the camera assembly to pass through. A through hole 6131 may be defined at a lower end of each leg 613.

The number of the optical machines 62 is two, and the number of the waveguide sheets 63 is also two. The two optical machines 62 and the two waveguide sheets 63 may be arranged on a connecting body 64, that is, the optical machines 62 and the waveguide sheets 63 are secured by the connecting body 64. One or more through holes 641 may be defined in the connecting body 64. These through holes 641 may have threads therein or have no thread. The two optical machines 62 may be arranged symmetrically in the accommodation cavity 17.

A liner 65 may further be provided underneath the connecting body 64. The liner 65 may be sleeved on the waveguide sheets 63 and abut against a lower surface of the connecting body 64. During assembly, the liner 65 is configured be sandwiched between the connecting body 64 and the bottom plate 121 of the main rear casing 12, so as to avoid rigid contact between the connecting body 64 and the main rear casing 12 and thereby provide protective effect. The liner 65 may be made of flexible rubber, foam, and other compressible or elastic materials.

Figure 25:
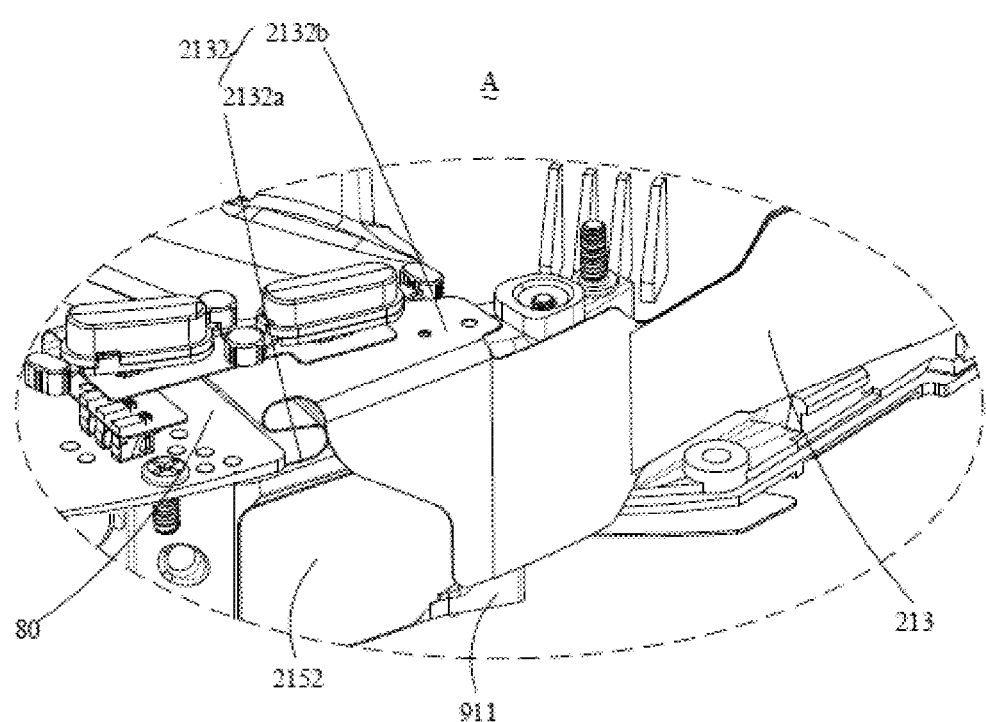
FIG. 25 is a perspective enlarged view of a circle A part in FIG. 2.
Figure 28:
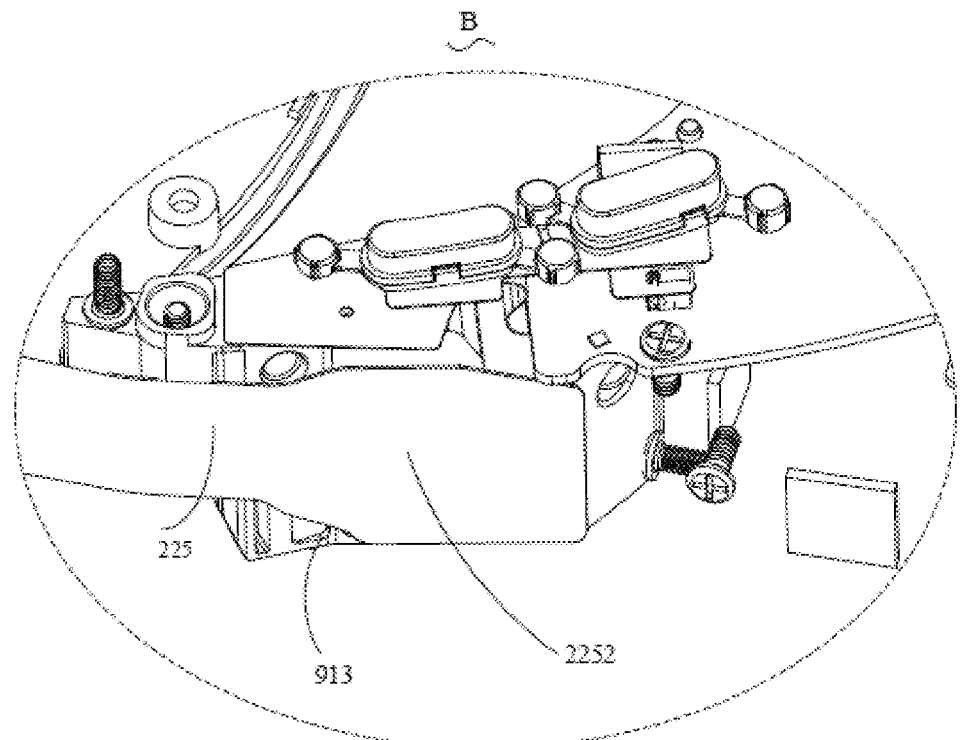
FIG. 28 is a perspective enlarged view of a circle B part in FIG. 3.

Each optical machine 62 may further be connected to a heat dissipation sheet 621 in the accommodation cavity 17, so as to perform heat conduct connection and heat dissipation for one or more heat sources 622, such as LED lamps, of the optical machine 62. In an embodiment, the heat dissipation sheet 621 may include a first heat dissipation portion 6211, a second heat dissipation portion 6212, and a third heat dissipation portion 6213. The first heat dissipation portion 6211 and the second heat dissipation portion 6212 may be connected together, and a top surface of the first heat dissipation portion 6211 and a top surface of the second heat dissipation portion 6212 may be arranged to be coplanar. The third heat dissipation portion 6213 may extend laterally from a connection part between the first heat dissipation portion 6211 and the second heat dissipation portion 6212. For example, the third heat dissipation portion 6213 may extend perpendicularly from the connection part between the first heat dissipation portion 6211 and the second heat dissipation portion 6212. Among them, the second heat dissipation portion 6212 may be connected to a heat source 622 for heat dissipation, and the third heat dissipation portion 6213 may be connected to another heat source 622 for heat dissipation. The first heat dissipation portion 6211, the second heat dissipation portion 6212, and the third heat dissipation portion 6213 of the heat dissipation sheet 621 may be arranged separately, and may also be arranged in an integral structure to facilitate assembly. In addition, the heat dissipation sheet 621 may further extend into internal spaces of the optical mechanical assembly 60 and/or the first housing assembly 10, and may further contact with other heat emission members to perform simultaneous heat dissipation for more heat emission members. For example, the first heat dissipation portion 6211 of the heat dissipation sheet 621 may extend rearward to be thermal-conductively connected to a power supply FPC 213 of the strap assembly 20 (as shown in FIG. 25) or a second heat dissipation sheet 225 (as shown in FIG. 28). At least one of the heat dissipation sheet 621 and the second heat dissipation sheet 225 may include a graphite sheet.

Each optical machine 62 may be a projecting device. The optical machine 62 provides light to the waveguide sheet 63. The light is configured to provide information and/or images for enhancing users' observation to the physical world. The light coming from the optical machine 62 may be coupled into the waveguide sheet 63. The light generates total internal reflection in the waveguide sheet 63, then the light coupled out from the waveguide sheet 63, so that the light can be seen by users.

During assembly, a screw can run through the through hole 6111 of the top plate 611 and the through hole 641 of the connecting body 64 to fix the optical machine support 61, the optical machine 62, and the waveguide sheet 63 together. It should be noted that, in the assembled optical mechanical assembly 60, a receiving space is defined between the connecting body 64 and the side plate 612 of the optical machine support 61 for receiving a part of the camera assembly 70.

Figure 15:
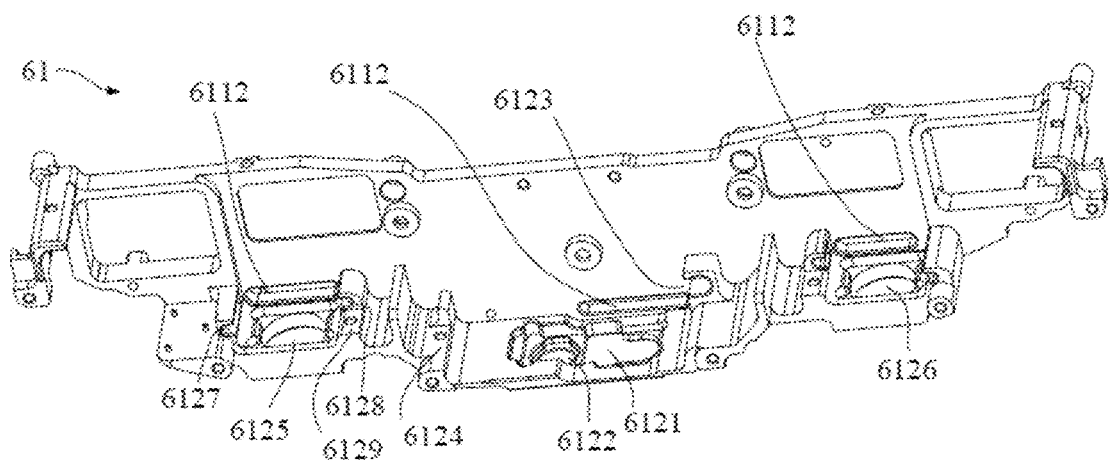
FIG. 15 is a perspective schematic view of an optical machine bracket of the optical machine assembly in FIG. 14.

Also as shown in FIG. 15, a perspective view of the optical machine support 61 of the optical mechanical assembly 60 in FIG. 14 in another view angle is illustrated. As shown in FIG. 15, a slot 6123 and an abutting portion 6124 are defined on a rear side surface of the side plate 612 and respectively located at two sides of a middle part thereof where the through holes 6121 and 6122 are defined. A location of the slot 6123 may be higher than a location of the abutting portion 6124. The abutting portion 6124 may include a flat surface, and may define a threaded hole. On the rear side surface of the side plate 612, a slot 6127 is defined at a side of a part thereof defining a through hole 6125, and a slot 6128 and an abutting portion 6129 are defined at another side of this part. The slot 6128 and the abutting portion 6129 may be directly adjacent to each other. Atop end of the slot 6127 is flush with a top end of the slot 6128, but a length of the slot 6127 extending downward is greater than a length of the slot 6128 extending downward. The abutting portion 6129 may have a flat surface, and may define a threaded hole. A location of the slot 6128 may be higher than a location of the abutting portion 6129. Slots and abutting portions being identical or similar to the slot 6127, the slot 6128, and the abutting portions 6129 may be defined on the rear side surface of the side plate 612 and located at a part thereof defining the through hole 6126, which will be not be repeated here.

Figure 16:
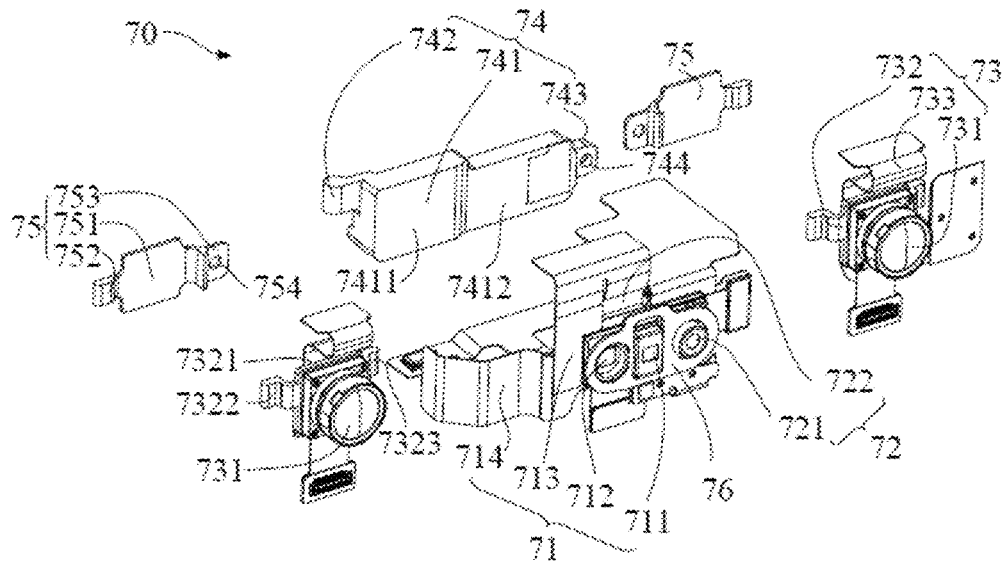
FIG. 16 is a perspective disassembled view of a camera assembly of a head-mounted device in an embodiment of the present application.

As shown in FIG. 16, the camera assembly 70 of the head-mounted device 100 in an embodiment of the present application is shown. The camera assembly 70 is mounted on the optical machine support 61 of the optical mechanical assembly 60, and may include a TOF (Time of flight, TOF for short) camera 71, an RGB camera 72, two fisheye cameras 73, a first camera stand 74 configured to fix the TOF camera 71 and the RGB camera 72, and two second camera stands 75 configured to fix the two fisheye cameras 73 respectively.

The TOF camera 71 may include a light emitting module 711, a light-sensitive receiving module 712, an FPC 713, and a heat dissipation sheet 714. Both the light emitting module 711 and the light-sensitive receiving module 712 are connected to the FPC 713. The light emitting module 711 has a front end portion, and the front end portion may also be regarded as a front end portion of the TOF camera 71. The heat dissipation sheet 714 is connected to the FPC 713, for example, is attached to a rear surface of the FPC 713, for heat dissipation. The heat dissipation sheet 714 has a rear side surface, and the rear side surface may also be regarded as a rear side surface of the TOF camera 71. When the TOF camera 71 works, the light emitting module 711 is configured to emit a modulated light beam. The light beam is reflected by a target object and then received by the light-sensitive receiving module 712. The light-sensitive receiving module 712 can obtain a flight time of the light beam in the space by demodulation, and then calculate a distance corresponding to the target object. In this way, with the TOF camera 71, when a user wears the head-mounted device 100 and walks in an environment of, for example, a room for a turn, a shape and a model of the room can be modeled out. That is, by measuring a distance from each point to the head-mounted device 100 worn by the user, the shape and the model of the room in which the user is located can be determined, and a scene can be constructed out.

The RGB camera 72 may be configured to capture two-dimensional color images, screen chromatic aberration of images, etc.; it is connected to the TOF camera 71 and may be fixed by the first camera stand 74. The RGB camera 72 may include a camera body 721 and an FPC 722. The camera body 721 may include a front end portion, the front end portion may also be regarded as a front end portion of the RGB camera 72. The camera body 721 is connected to the FPC 722. Top ends of the FPC 722 and of the FPC 713 may be connected together. The heat dissipation sheet 714 may also be connected to the FPC 722, for example, be attached to a rear surface of the FPC 722, for heat dissipation. A rear side surface of the heat dissipation sheet 714 may also be regarded as a rear side surface of the RGB camera 72.

A liner 76 may further be sleeved on the front end portions of the TOF camera 71 and of the RGB camera 72. During assembly, the linear 76 is configured to be sandwiched between the TOF camera 71, the RGB camera 72 and the side plate 612 of the optical machine support 61, so as to avoid rigid contact between the TOF camera 71, the RGB camera 72 and the optical machine support 61 and thereby provide protective effect. The liner 76 may be made of flexible rubber, foam, and other compressible or elastic materials.

Each fisheye camera 73 may include a camera body 731, a camera mounting plate 732, and an FPC 733. The camera body 731 has a front end portion, and the front end portion may also be regarded as a front end portion of the fisheye camera 73. The camera body 731 is connected to the FPC 733, and is mounted to the camera mounting plate 732. The FPC 733 has a rear side surface, and the camera mounting plate 732 also has a rear side surface. The FPC 733 or the camera mounting plate 732 may be arranged to be adjacent to the second camera stand 75, in this situation, their corresponding rear side surfaces may be regarded as a rear side surface of the fisheye camera 73. The camera mounting plate 732 may include a body portion 7321, a first insertion portion 7322, and a second insertion portion 7323. The body portion 7321 is configured to bear the camera body 731. For example, the camera body 731 may be fixed to the body portion 7321 by an adhesive-dispensing process or screws. The first insertion portion 7322 and the second insertion portion 7323 are respectively located at two sides of the body portion 7321. In an up-down direction, the first insertion portion 7322 and the second insertion portion 7323 may be located at a middle top position of the body portion 7321, in other words, connection positions between the first insertion portion 7322, the second insertion portion 7323 and the body portion 7321 are adjacent to a top part of the body portion 7321. A side of the first insertion portion 7322 may include a semi-cylindrical portion, and a side of the second insertion portion 7323 may also include a semi-cylindrical portion.

In one embodiments the TOF camera 71 and the RGB camera 72 are arranged adjacent to each other and receive external light through the first through hole 1131. The two fisheye cameras 73 are respectively located at two sides of the TOF camera 71 and the RGB camera 72. The two fisheye cameras 73 may mainly be configured to cooperatively image. Of course, the location arrangement of these cameras is not limited herein and can be adjusted as per actual needs. In addition, the types of the cameras are not limited herein, and different types of cameras may be selected as per actual needs.

Adopting different cameras and different location arrangements makes imaging principles and effects be different. For example, the four cameras—the TOF camera 71, the RGB camera 72, and the two fisheye cameras 73—may be complementary to each other. Among them, the fisheye cameras 73 may have greater shooting angles and may be wide-angle cameras, but their resolutions may be relatively low. A resolution of RGB camera 72 may be relatively high, but a shooting angle thereof may be relatively small. By combining the RGB camera 72 and the fisheye cameras 73, an image that has a larger shooting angle and is clearer may be formed.

The first camera stand 74 is located behind the TOF camera 71 and the RGB camera 72, so as to mount the TOF camera 71 and the RGB camera 72 on the optical machine support 61 of the optical machine assembly 60. The first camera stand 74 may include a middle portion 741, an insertion portion 742, and a fixing portion 743. The middle portion 741 has a pressing surface facing the TOF camera 71 and the RGB camera 72. The pressing surface may include two flat surfaces, i.e., a first flat surface 7411 and a second flat surface 7412. The insertion portion 742 and the fixing portion 743 are respectively located at two sides of the middle portion 741. Among them, in an up-down direction, the insertion portion 742 and the fixing portion 743 may be located at locations with different heights at two sides of the middle portion 741, for example, a location of the insertion portion 742 may be higher than a location of the fixing portion 743. A side of the insertion portion 742 may include a semi-cylindrical portion to facilitate rotation in the slot 6123. The fixing portion 743 has a through hole 744.

The two second camera stands 75 are arranged symmetrically and respectively located behind the two fisheye cameras 73. Each of the second camera stands 75 may include a middle portion 751, an insertion portion 752, and a fixing portion 753. The middle portion 751 is connected between the insertion portion 752 and the fixing portion 75, and is arranged to be farther from the fisheye cameras 73 than the insertion portion 752 and the fixing portion 753. The insertion portion 752 and the fixing portion 753 are respectively located at two sides of the middle portion 751. In an up-down direction, the insertion portion 752 and the fixing portion 753 may be located at locations with the same or different heights at two sides of the middle portion 751. For example, the insertion portion 752 may be located at a middle position or a middle bottom position at one side of the middle portion 751. in other words, a connection position between the insertion portion 752 and the middle portion 751 is located between a top part and a bottom part of the middle portion 751, or adjacent to the bottom part of the middle portion 751. The fixing portion 753 may be located at a middle position of another side of the middle portion 751. A side of the insertion portion 752 may include a semi-cylindrical portion to facilitate rotation in the slot 6127. The fixing portion 753 has a through hole 754.

Figure 17:
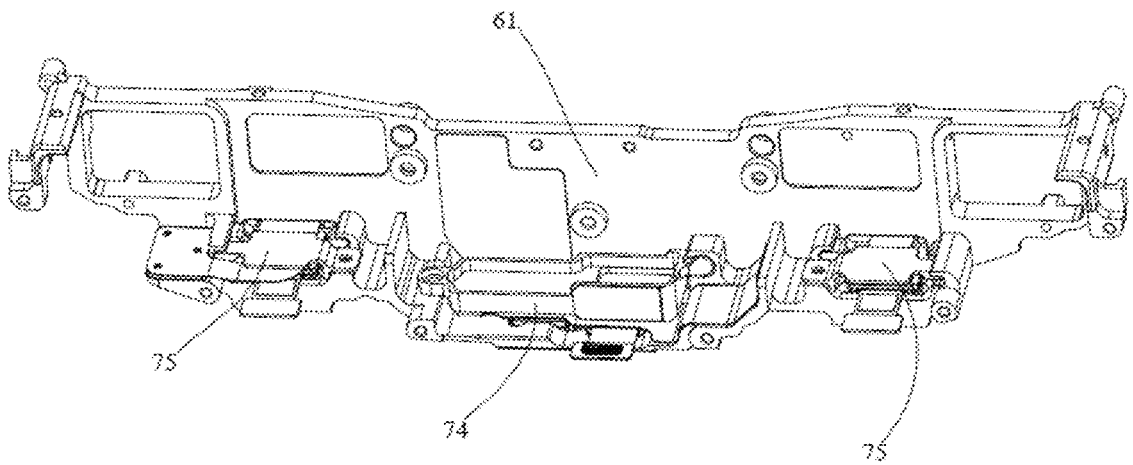
FIG. 17 is a perspective assembled view of a camera assembly and an optical machine bracket of a head-mounted device in an embodiment of the present application.

As shown in FIGS. 15, 16 and 17, when assembling the TOF camera 71 and the RGB camera 72 to the optical machine assembly 60, the TOF camera 71 and the RGB camera 72 are fixed to the optical machine support 61 of the optical machine assembly 60 through the first camera stand 74. Specifically, at first, the TOF camera 71 and the RGB camera 72 may be inserted into the through hole 6121 and the through hole 6122 of the optical machine support 61 from the rear. The insertion portion 742 may then be inserted into the slot 6123 of the optical machine support 61, so that the fixing portion 743 abuts against the abutting portion 6124. Next, a screw is used to run through the through hole 744 of the fixing portion 743, and then be screwed into the threaded hole of the abutting portion 6124 of the optical machine support 61. In this way, the TOF camera 71 and the RGB camera 72 are mounted to the optical machine support 61, and thus the middle portion 741 is pressed on the rear side surfaces of the TOF camera 71 and the RGB camera 72. In an assembled state in which the camera assembly 70 and the optical machine assembly 60 are in the first housing assembly 10, the front end portion of the light-sensitive receiving module 712 of the TOF camera 71 is inserted in the through hole 6121 of the optical machine support 61. The front end portion of the light-sensitive receiving module 712 is further in correspondence with the through hole 1131 of the second portion 113 of the main front casing 11, and is also in correspondence with one lens part 1338 of the second lens 1333 of the lens assembly 133. The front end portion of the light emitting module 711 of the TOF camera 71 is inserted in the through hole 6121 of the optical machine support 61. The front end portion of the light emitting module 711 is further in correspondence with the through hole 1131 of the second portion 113 of the main front casing 11, and is also in correspondence with the first lens 1332 of the lens assembly 133. The front end portion of the RGB camera 72 is inserted in the through hole 6122 of the optical machine support 61. The front end portion of the RGB camera 72 is further in correspondence with the through hole 1131 of the second portion 113 of the main front casing 11, and is also in correspondence with the other lens part 1338 of the second lens 1333 of the lens assembly 133.

When assembling the fisheye cameras 73 to the optical machine assembly 60, the two fisheye cameras 73 are respectively fixed to the side plate 612 of the optical machine support 61 of the optical machine assembly 60 through the two second camera stands 75. Specifically, at first, the camera body 731 of each fisheye camera 73 may be inserted into the through hole 6125 or 6126 of the optical machine support 61 from the rear. Thus, the first insertion portion 7322 and the second insertion portion 7323 of the camera mounting plate 732 are inserted into the slot 6127 and the slot 6128 of the optical machine support 61 respectively and simultaneously, and the camera body 731 and the camera mounting plate 732 are fixed together by screws. Next, the insertion portion 752 of the second camera stand 75 may be inserted into the slot 6127 of the optical machine support 61. A screw is used to pass through the through hole 754 of the fixing portion 753, and then be screwed into the threaded hole of the abutting portion 6129 of the optical machine support 61. In this way, the fisheye cameras 73 can be mounted on the optical machine support 61, and the middle portion 751 is then pressed on the rear side surface of the fisheye camera 73. Among them, the insertion portion 752 of the second camera stand 75 and the first insertion portion 7322 of the camera mounting plate 732 abut against and contact with each other in the slot 6127.

By fixing the TOF camera 71, the RGB camera 72, and the fisheye cameras 73 using the above-mentioned structures, some fixing screws may be avoided, so that assembling efficiency is improved.

Since the TOF camera 71, the RGB camera 72, and the fisheye cameras 73 are all mounted on the optical machine support 61, the optical machine support 61 may also be referred as a mounting base.

In an assembled state in which the camera assembly 70 and the optical machine assembly 60 are located in the first housing assembly 10, the front end portion of one fisheye camera 73 is inserted in the through hole 6125 of the optical machine support 61 and is in correspondence with one through hole 1132 of the second portion 113 of the main front casing 11 so as to receive external light. The front end portion of another fisheye camera 73 is inserted in the through hole 6126 of the optical machine support 61 and is in correspondence with another through hole 1132 of the second portion 113 of the main front casing 11 so as to receive external light.

Figure 19:
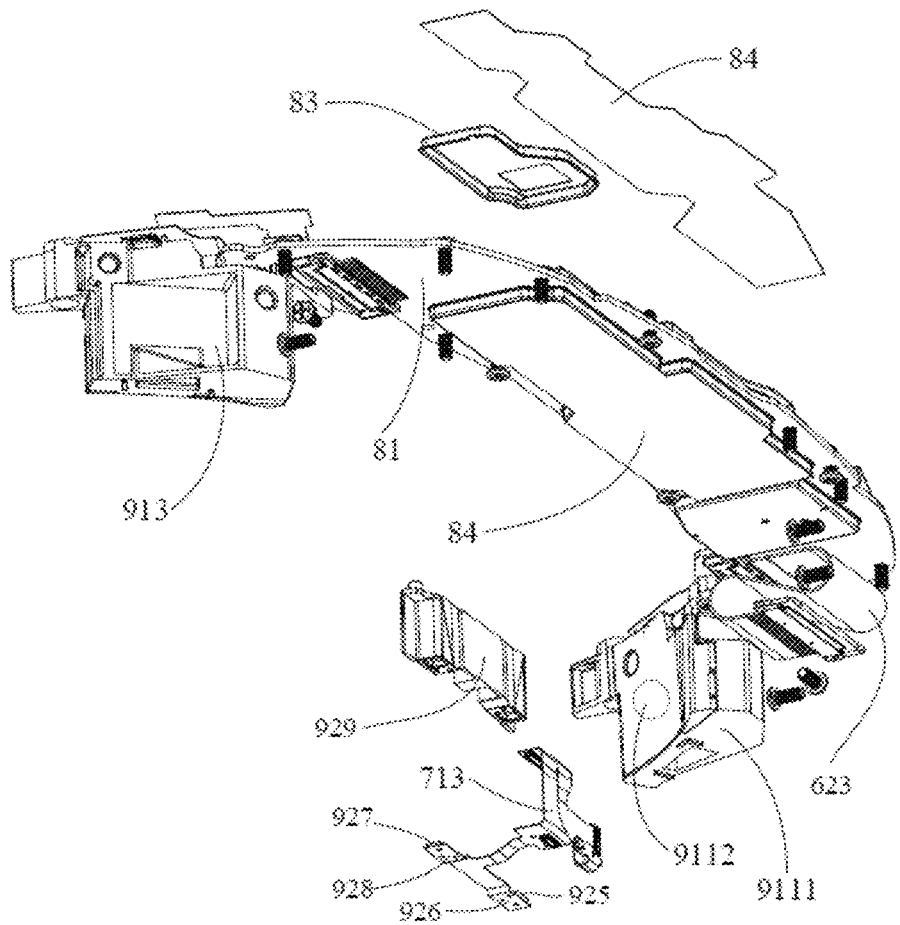
FIG. 19 is a perspective disassembled view in another view angle of the motherboard, the speaker assembly, and the microphone assembly in FIG. 18.

As shown in FIGS. 18 and 19, perspective disassembled views of the motherboard 80, the speaker assembly 91, and the microphone assembly 92 of the head-mounted device 100 in an embodiment of the present application are illustrated.

The motherboard 80 is mounted on the optical machine assembly 60 and may include a PCB (Printed Circuit Board, collectively referred to herein as PCB) 81, and one or more chips 82, one or more protective covers 83, and one or more heat dissipation sheets 84 arranged on the PCB 81.

The PCB 81 may be a substrate with printed cables, and may be used as a carrier for electrical connection of electronic components. These chips 82 can be mounted on the PCB 81, wherein one or more protective covers 83 may cover some chips 82 for protection. The heat dissipation sheet 84 may be provided on an outer surface of a protective cover 83 for heat dissipation. The heat dissipation sheet 84 may be a graphite heat dissipation sheet.

Left and right sides of the PCB 81 may be further connected to two key FPC 162 respectively. Each key FPC 162 may include a connection segment 1621, a key segment 1622 and a bending segment 1623 arranged between the connection segment 1621 and the key segment 1622. The connection segment 1621 is configured to connect with the PCB 81. When the motherboard 80 is assembled in the first housing assembly 10, each key FPC 162 may be folded upward such that the key segment 1622 is arranged in the accommodating part 1113 of the top plate 111 of the main front casing 11, and thus the key segment 1622 may be pressed by the post 161 below the side key 16.

A left side of the PCB 81 may also be connected to an optical machine FPC 623. The optical machine FPC 623 is configured to connect the left optical machine 62 with the PCB 81. Similarly, a right side of the PCB 81 may also be connected to an optical machine FPC (not shown) configured to connect the right optical machine 62 to the PCB 81.

As shown in FIG. 18, the speaker assembly 91 may include a first speaker 911 and a second speaker 913. The first speaker 911 may be located at a left side of the motherboard 80, and the second speaker 913 may be located at a right side of the motherboard 80. In the assembled structure, the first speaker 911 may be connected to a left end of the PCB 81, and located below the key FPC 162 at the left side; the second speaker 913 may be connected to a right end of the PCB 81, and located below the key FPC 162 at the right side. The first speaker 911 may extend rearward from a left end of the PCB 81. The second speaker 913 may extend rearward from a right end of the PCB 81.

In an embodiment, the accommodation cavity 17 defined by the first housing assembly 10 may include a first cavity configured to receive the motherboard 80, and a second cavity and a third cavity which are respectively located at two opposite sides of the first cavity. The first speaker 911 may be located in the second cavity and be in contact with and connected to one end of the motherboard 80. The second speaker 913 may be located in the third cavity and be in contact with and connected to another end of the motherboard 80.

The second speaker 913 may include a sound cavity box 9131 and a speaker body 9132 arranged in the sound cavity box 9131. The sound cavity box 9131 is used to provide a certain sound cavity, so that sound emitted from the speaker body 9132 may be echoed inside the sound cavity box 9131, thereby making a user hear better sound effect. The first speaker 911 may have the same structure as that of the second speaker 913, that is, the first speaker 911 may include a sound cavity box 9111 and a speaker body 9112 arranged in the sound cavity box 9111 (as shown in FIG. 19). The first speaker 911 may be mounted at a left rear end of the motherboard 80 and connected to the motherboard 80 via wires or an FPC (not shown). Similarly, the second speaker 913 may be mounted at a right rear end of the motherboard 80 and connected to the motherboard 80 via wires or an FPC (not shown). It should be noted that, when the motherboard 80 and the speaker assembly 91 are assembled in the first housing assembly 10, the first speaker 911 and the second speaker 913 are respectively located at two corners of the first housing assembly 10. The first speaker 911 and the second speaker 913 are in correspondence with the speaker sound output holes 1215 defined in the bottom plate 121 of the first housing assembly 10, so as to output sound emitted by the first speaker 911 and the second speaker 913. The first speaker 911 and the second speaker 913 may also, for example, be located at positions below corresponding side keys 16. For example, the first speaker 911 is in correspondence with at least one side key 16 in a direction perpendicular to the top plate 111, and the second speaker 913 is in correspondence with at least one side key 16 in a direction perpendicular to the top plate 111. Since the space in the two corners of the first housing assembly 10 is utilized, the structure is enabled to be more compact, and the sound effect may also be improved.

In an embodiment, the microphone assembly 92 may include a first microphone 921, a second microphone 923, a third microphone 925, and a fourth microphone 927, which are all arranged in the accommodation cavity 17.

The first microphone 921 may be connected to the PCB 81 through the power supply FPC 213 (as shown in FIG. 25), and the second microphone 923 may be connected to the PCB 81 through the FPC 924. In an embodiment, the first microphone 921 may be connected to the PCB 81 by wires or a separate FPC. Among them, the first microphone 921 and the second microphone 923 may be respectively arranged at two sides of the PCB 81. For example, when the motherboard 80 is assembled in the first housing assembly 10, the first microphone 921 is in correspondence with an exit 1162 of a channel 1160 defined at a front-left side of the first portion 112 of the main front casing 11, so as to receive external sound through the channel 1160; the second microphone 923 is in correspondence with an exit 1162 of a channel 1160 defined at a right-left side of the first portion 112 of the main front casing 11, so as to receive external sound through the channel 1160. The first microphone 921 may further be supported by the first speaker 911 or be fixed on the first speaker 911. The second microphone 923 may further be supported by the second speaker 913 or fixed on the second speaker 913.

The third microphone 925 and the fourth microphone 927 may be located at positions below the middle portion of the PCB 81, and be respectively in correspondence with exits 1242 of the two channels 1240 in the bottom plate 121 of the main front casing 11, so as to receive external sound through the two channels 1240 respectively. Since positions of the third microphone 925 and the fourth microphone 927 are lower than the PCB 81, a supporting member 929 may be provided between the PCB 81 and the third microphone 925 and the fourth microphone 927. That is, the third microphone 925 and the fourth microphone 927 may be supported by the supporting member 929, and the supporting member 929 may be fixed on the PCB 81. The third microphone 925 may be connected to the PCB 81 through a FPC 926, the fourth microphone 927 may be connected to the PCB 81 through a FPC 928. In an embodiment, the FPC 926 and the FPC 928 may be joined with the FPC 713 of the camera assembly 70 and then connected to the PCB 81. In another embodiment, the FPC 926 and the FPC 928 may also be connected to the PCB 81 respectively, and the FPC 926 and the FPC 928 may also be joined together and then connected to the PCB 81.

By such arrangement of the microphone assembly 92, their mutual interferences are less and directional differences are larger.

Assembly of the Front Portion

Figure 20:
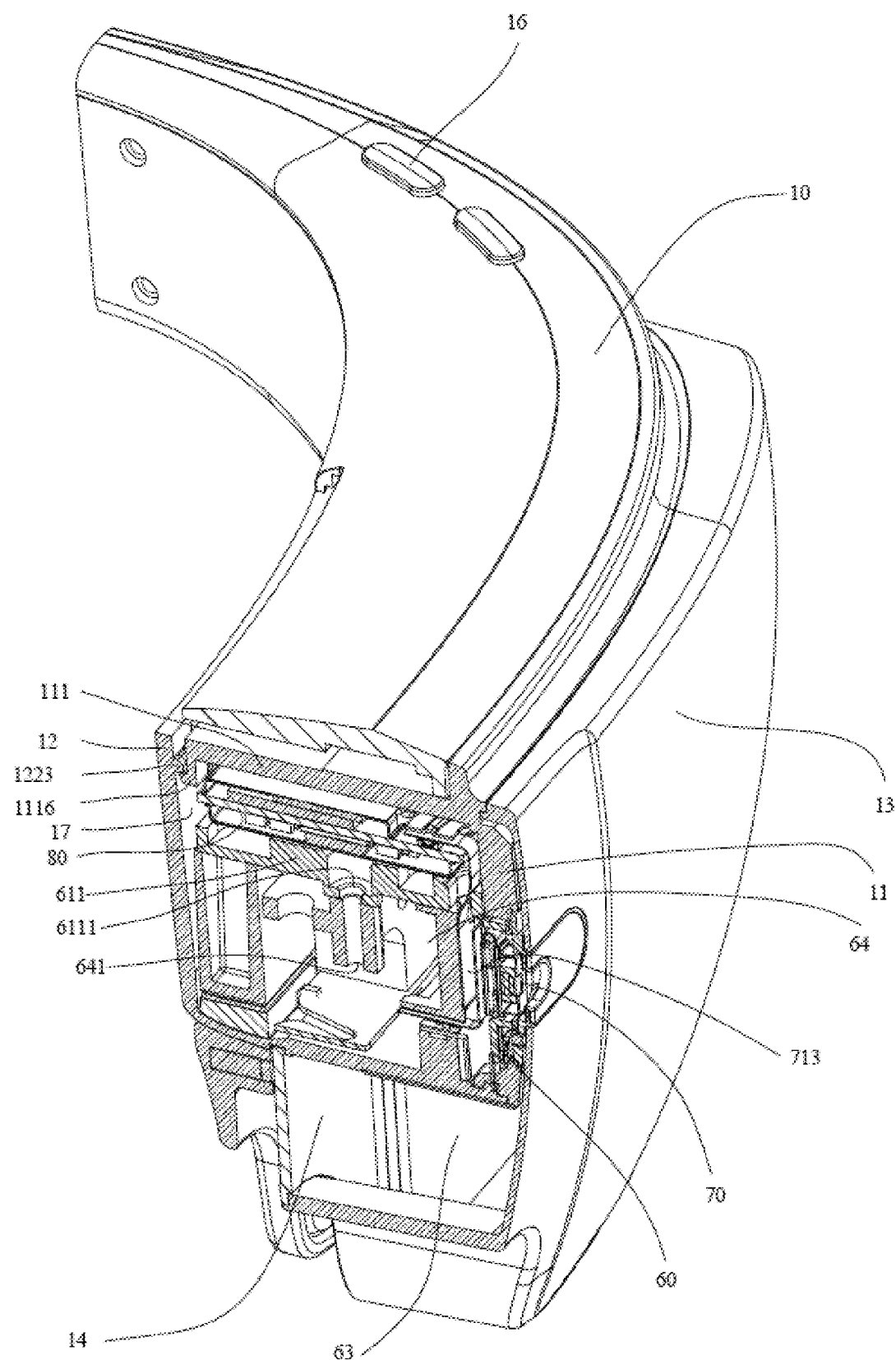
FIG. 20 is a cut-away view of the first housing assembly, the optical machine assembly, the camera assembly, the speaker, and the motherboard of the head-mounted device in FIG. 1.
Figure 21:
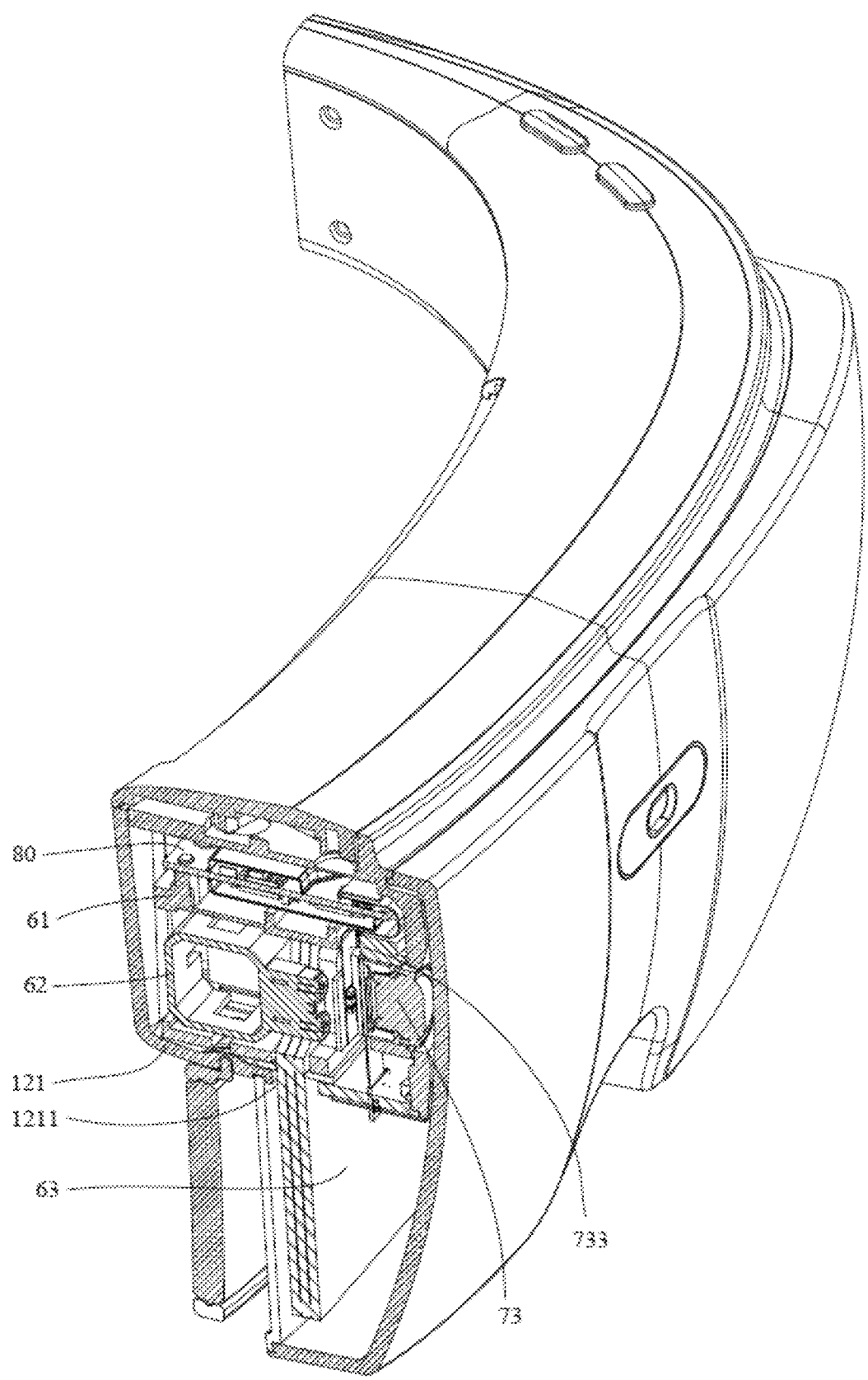
FIG. 21 is another cut-away view of the first housing assembly, the optical machine assembly, the camera assembly, the speaker, and the motherboard of the head-mounted device in FIG. 1.

As shown in FIG. 20 to FIG. 22, schematic views of assembly relationship among the first housing assembly 10, the optical machine assembly 60, the camera assembly 70, the motherboard 80, and the speaker assembly 91 of the head-mounted device 100 in an embodiment of the present application are illustrated.

As shown in FIG. 20 and FIG. 21, the TOF camera 71, the RGB camera 72, and the two fisheye cameras 73 of the camera assembly 70 are fixed on the optical machine support 61 of the optical machine assembly 60, thereby achieving assembly of the camera assembly 70 and the optical machine assembly 60.

The motherboard 80 may be arranged above the top plate 611 of the optical machine stand 61, and the motherboard 80 and the optical machine stand 61 are secured together by screws. Afterwards, as further shown in FIG. 16, FIG. 20, and FIG. 21, an upper end formed by the FPC 722 and the FPC 713 connected together and an upper end of the FPC 733 are connected to the motherboard 80 to realize power-on and/or signal transmission.

As further shown in FIG. 20 and FIG. 22, the main front casing 11 may be secured with the motherboard 80. For example, as further shown in FIG. 6, screws are used to pass through some through holes 1114 of the main front casing 11 and then tightly screwed into the motherboard 80.

As shown in FIG. 22, the first speaker 911 and the second speaker 913, after being connected to the motherboard 80, may also be further fixed to the main front casing 11 by screws respectively, for example, fixed to the top plate 111.

As further shown in FIG. 21 and FIG. 22, the two rectangular through holes 1211 and 1212 in the bottom plate 121 of the main rear casing 12 may be aligned with the two waveguide sheets 63 of the optical machine assembly 60 respectively, so that the two waveguide sheets 63 of the optical machine assembly 60 respectively pass through the two rectangular through holes 1211 and 1212 from the accommodation cavity 17 and protrude downward. A screw is then used to successively pass through the through hole 1114 of the main front casing 11 (as shown in FIG. 6) and the through hole 6131 in the leg 613 of the optical machine support 61 (as shown in FIG. 14), and screwed into the bottom plate 121 of the main rear casing 12, such that the optical machine assembly 60, the camera assembly 70, and the motherboard 80 are fixed between the main front casing 11 and the main rear casing 12. In addition, as further shown in FIG. 20, the main front casing 11 may form engagement matching with the snap structures 1223 of main rear casing 12 through the snap structures 1116, so that the main front casing 11 and the main rear casing 12 are secured together, and an accommodation cavity 17 is defined therebetween. Of course, the connection structure may also be strengthened by more screws, and the optical machine support 61 may also be fixed to the top plate 111 of the main front casing 11 by connection structures such as screws.

As further shown in FIG. 20 and FIG. 22, the side key 16 is arranged at the accommodating part 1113 of the main front casing 11, then the main casing decorating element 15 is placed on the top plate 111 of the main front casing 11, and the side key 16 is arranged to pass through the key hole 152 of the main casing decorating element 15 and partially protrude from the main casing decorating element 15. The main casing decorating element 15 may further be secured to the main front casing 11 by screws.

As further shown in FIG. 20 and FIG. 22, the mask 13 may approach toward the main front casing 11 and be buckled to the connection portion 114. The rear cover 14 may approach toward the mask 13, and be inserted into the lower part of the mask 13, such that the two waveguide sheets 63 are received between the mask portion 131 of the mask 13 and the light-transmitting portion 141 of the rear cover 14 to be protected.

Strap Assembly 20

Figure 23:
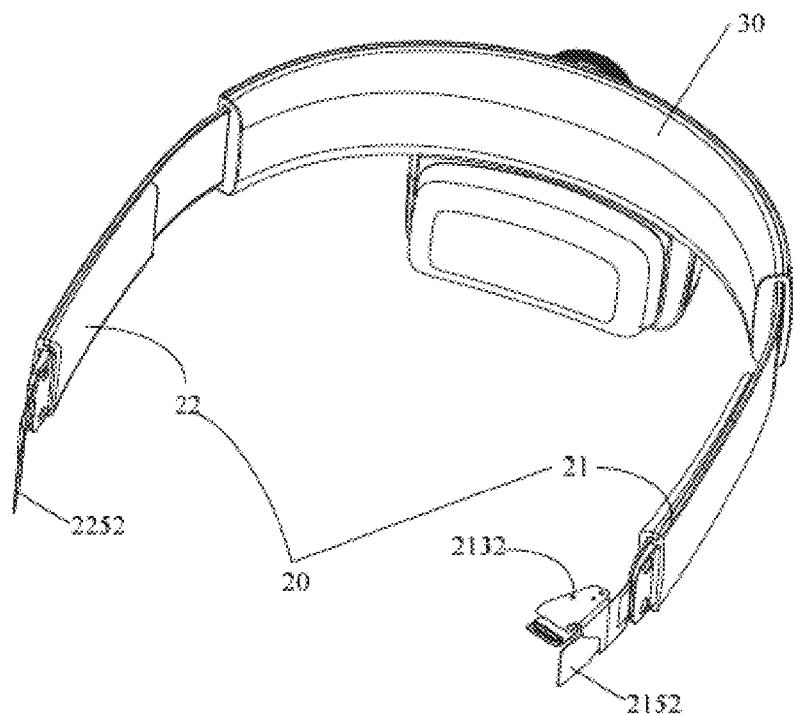
FIG. 23 is a perspective assembled view of a strap assembly and a second housing assembly in FIG. 1.

As shown in FIG. 23, which is a perspective assembly view of the strap assembly 20 and the second housing assembly 30 in an embodiment of the present application. The strap assembly 20 may include two headbands, which are respectively a first headband 21 and a second headband 22.

As further shown in FIG. 1 and FIG. 4, an end of the first headband 21 is connected to a corresponding end of the first housing assembly 10, and another end of the first headband 21 extends from a corresponding end of the second housing assembly 30 and further connected to tightness adjustment mechanism 40. The second headband 22 may be assembled in a similar assembly manner as that of the first headband 21.

First Headband 21 of Strap Assembly 20

Figure 24:
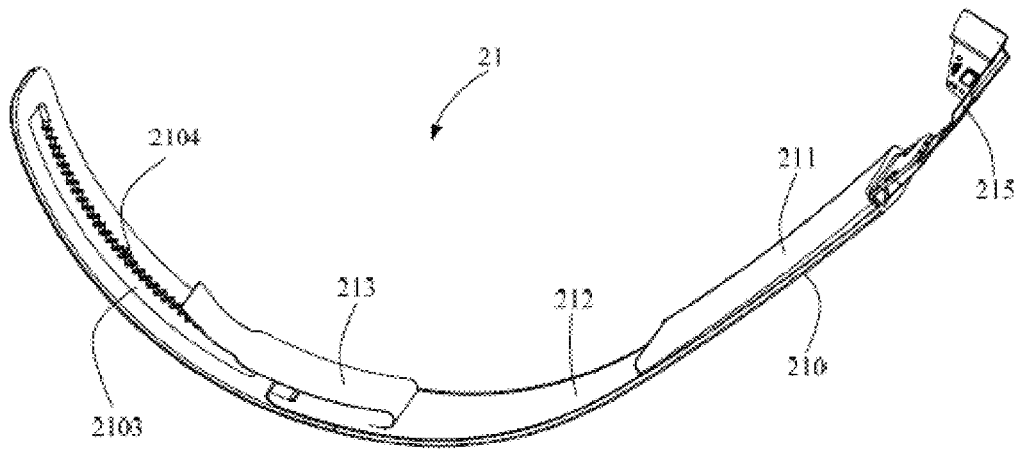
FIG. 24 is a perspective assembled view of a first head strap of the strap assembly in FIG. 23.

As shown in FIG. 24, which shows a perspective disassembled view of the first headband 21 in an embodiment of the present application. The first headband 21 may include a first headband body 210, a first headband cover 211 buckled together with the first headband body 210, and a first flexible strip 212, a power source FPC 213, a protective sheet 214, and a first heat sink 215 which are pressed between the first headband body 210 and the first headband cover 211.

The first headband body 210 may be made of a flexible material and may be bent arbitrarily, substantially in the shape of an elongated strip.

The first body portion 2101 has a uniform width and defines a length adjustment hole 2103 at an end thereof. The length adjustment hole 2103 is a strip-shaped through hole. The first headband body 210 is provided with first serrations 2104 extending along a length direction of the through hole in the length adjustment hole 2103 to cooperate with the tightness adjustment mechanism 40.

Figure 26:
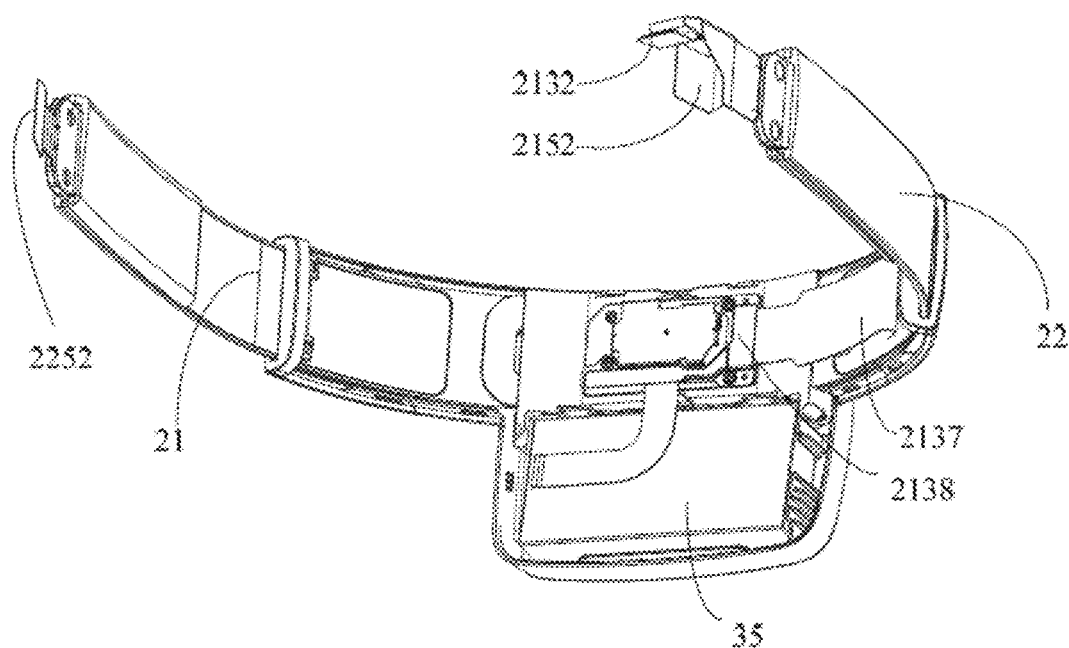
FIG. 26 is similar to FIG. 23 and shows a cooperation relationship of a power supply FPC in the strap assembly and related components in the second housing assembly.

As shown in FIG. 25, which is a partially enlarged view of the area A in FIG. 2, showing a schematic view of a connection between the first electrical connection portion 2132 and circuit components when the strap assembly 20 extends into the first housing assembly 10. Among them, the first electrical connection portion 2132 includes a wiring portion 2132a connected to the motherboard 80 and a wiring portion 2132b connected to the microphone assembly 92. Both the wiring portion 2132a and the second electrical connection portion 2138 are plug-in ports and are connected by plug-in connections. For example, as shown in FIG. 25, the motherboard 80 is plug-in-connected to the wiring portion 2132a. For example, as shown in FIG. 26, the second electrical connection portion 2138 is plug-in-connected to the battery 35.

The first heat sink 215 has a shape similar to that of the power source FPC 213, is arranged between the first headband cover 211 and the power source FPC 213, and may include a first attachment portion 2152 extending into the first housing assembly 10. For example, as shown in FIG. 25, the first attachment portion 2152 is attached to a side wall of the speaker body 9132.

Second Headband 22 of Strap Assembly 20

Figure 27:
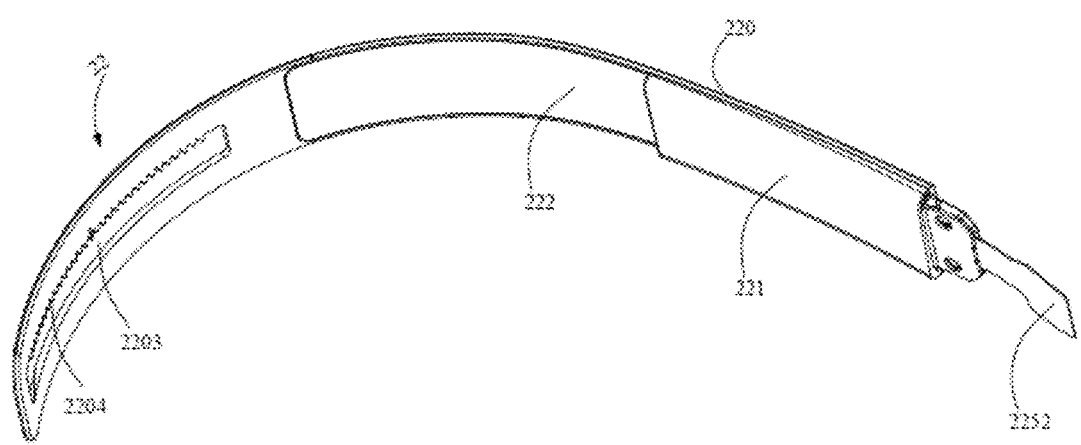
FIG. 27 is a perspective assembled view of a second head strap of the strap assembly in FIG. 23.
Figure 31:
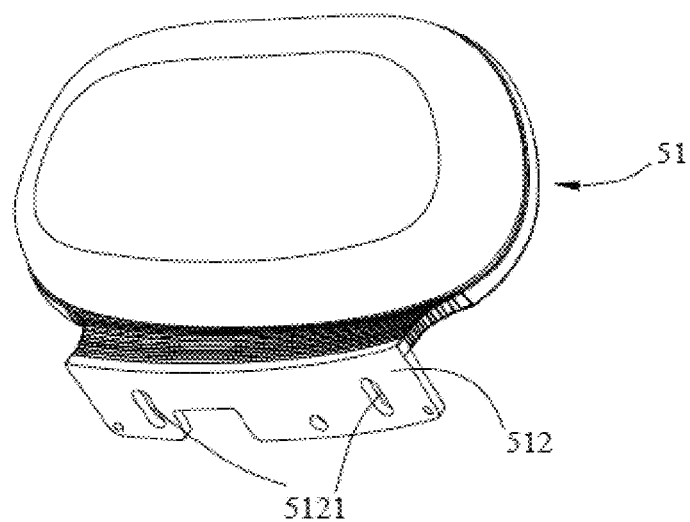
FIG. 31 is a perspective view in another angle of a first bearing member of a bearing assembly in FIG. 1.

As shown in FIG. 27, which discloses a perspective assembly view of the second headband 22 in embodiment of the present application. The second headband 22 is similar to the first headband 21, and the difference between the two is that the second headband 22 is not provided with a power source FPC and a protective sheet therefor. The second headband 22 may include a second headband body 220, a second headband cover 221, a second flexible strip 222 pressed between the second headband body 220 and the second headband cover 221, and a second heat sink 225. The structure of the second headband body 220 is substantially the same as that of the first headband body 210. Reference may be made to FIG. 31 for details, no detail description is provided here, while only the main components are listed, and the specific cooperation relationship and functions are referred to the introduction of the first headband body 210. The second headband body 220 has a length adjustment hole 2203 and second serrations 2204.

The second heat sink 225 has substantially the same structure as the first heat sink 215 and may include a second attachment portion 2252 extending into the first housing assembly 10. As shown in FIG. 28, the second attachment portion 2252 is attached to a side wall of the speaker body 9132 of the second speaker 913.

Second Housing Assembly 30

Figure 29:
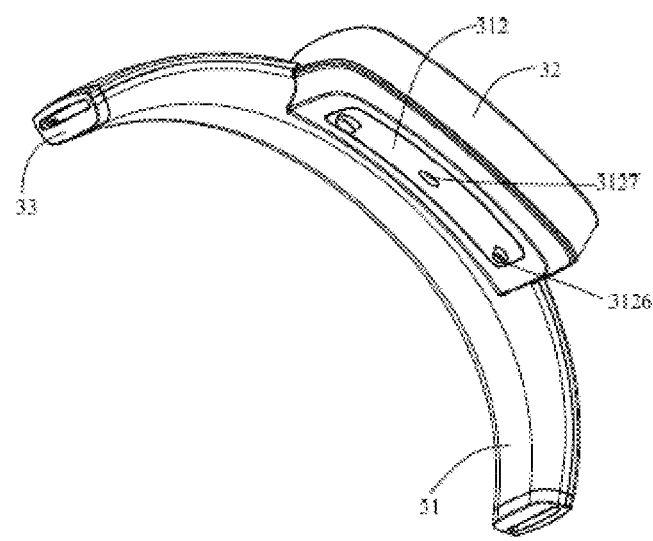
FIG. 29 is a perspective assembled view of the second housing assembly.

Referring to FIG. 29, which discloses a perspective combined view of the second housing assembly 30 in an embodiment. The second housing assembly 30 may include a bottom front housing 31, a bottom rear housing 32, and a connecting member 33 connected to the front housing 31 and the bottom rear housing 32. The second housing assembly 30 may accommodate the strap assembly 20 and the tightness adjustment mechanism 40.

Tightness Adjustment Mechanism 40

Figure 30:
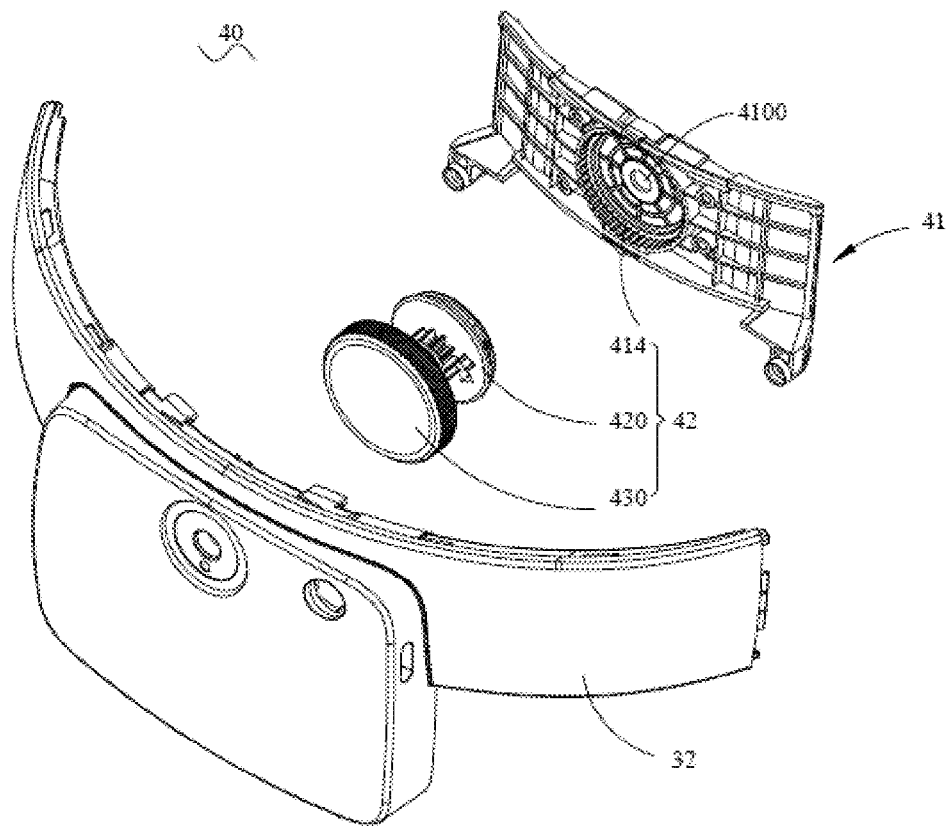
FIG. 30 is a perspective disassembled view of a tightness adjustment mechanism.

Referring to FIG. 30, which discloses a perspective disassembled view of the tightness adjustment mechanism 40 in an embodiment of the present application. The tightness adjustment mechanism 40 may include a first housing 41, a second housing that cooperates with the first housing 41 (the second housing herein is the bottom rear housing 32 of the second housing assembly 30 described above; the bottom rear housing 32 may be a component shared by the tightness adjustment mechanism 40 and the second housing assembly 30), and a ratchet and pawl mechanism 42. The first housing 41 and the second housing are buckled to form a box body, and a main body of the ratchet and pawl mechanism 42 may be received in the box body. The two headbands (i.e., the first headband 21 and the second headband 22) of the strap assembly 20 may be extended into the box body to overlap and connect to the ratchet and pawl mechanism 42. A length of the first and second headbands 21 and 22 that overlap each other may be adjusted by the ratchet and pawl mechanism 42. The second housing is not a necessary component here, and it is also possible to form the tightness adjustment mechanism 40 by only mounting the ratchet and pawl mechanism 42 to the first housing 41.

Ratchet and Pawl Mechanism 42 of Tightness Adjustment Mechanism 40

As shown in FIG. 30, the ratchet and pawl mechanism 42 may include a ratchet 414 formed on the first housing 41, a pawl assembly 420 that cooperates with the ratchet 414 and is received therein, and a knob assembly 430 that is arranged and fixed on the pawl assembly 420, capable of driving the pawl assembly 420 to rotate, and slidably connected to a central hole 4100.

Force Receiving Assembly 50

Referring to FIG. 1, which discloses a perspective structural schematic view of the head-mounted device 100 according to an embodiment, in which the force receiving assembly 50 includes a first force receiving member 51 arranged on the first housing assembly 10 and a second force receiving member 52 arranged on the second housing assembly 30. In this embodiment, the first housing assembly 10, the strap assembly 20, the second housing assembly 30, and the tightness adjustment mechanism 40 may form a ring frame with adjustable elasticity. The first force receiving member 51 and the second force receiving member 52 are respectively disposed at one side and another side of the ring frame, for example, at upper and lower sides of the first housing assembly 10 and the second housing assembly 30 respectively. The first force receiving member 51 is inclined to a side close to the second force receiving member 52. In addition, the first force receiving member 51 is a first force receiving point, the first housing assembly 10 is a second force receiving point, and the second force receiving member 52 is a third force receiving point. The head-mounted device 100 is firmly supported and worn through the first, second, and third force receiving points.

It can be understood that the "first force receiving member" and the "second force receiving member" can also be referred to as "force receiving members", respectively.

First Force Member 51 of Force Assembly 50

As shown in FIG. 2 and FIG. 31, which disclose perspective views of the first force receiving member 51 in an embodiment from two different perspectives. Among them, the first force receiving member 51 may include a supporting plate 511, a mounting plate 512 arranged substantially at an angle relative to the supporting plate 511, a neck portion 513 disposed between the supporting plate 511 and the mounting plate 512 and connecting the two, and a soft pad 514 arranged on the supporting plate 511.

The mounting plate 512 is a plate-like structure with a thickness, which is made of a hard material, and is configured to cooperate with the top plate 111 of the first housing assembly 10 and the main casing decorating element 15 for mounting. The mounting plate 512 defines a strip-shaped adjustable through hole 5121 corresponding to the post 156 on the lower surface 155 of the main casing decorating element 15 for the post 156 to run through. There may be two adjustable through holes 5121, which may be parallel to each other. The neck portion 513 is made of a hard material. A thickness of the neck portion 513 in a front-rear direction is approximately equal to a depth of the recess 154 of the main casing decorating element 15, such that the recess 154 of the main casing decorating element 15 can receive a part of the neck portion 513, and may even just secure the neck portion 513.

Specifically, the strip-shaped adjustable through hole 5121 in the mounting plate 512 of the first force receiving member 51 and the main casing decorating element 15 of which the post 156 is located in the adjustable through hole 5121 form an adjustable structure of the present application. The post 156 is inserted in the adjustable through hole 5121 and may be positioned at different locations in the adjustable through hole 5121, such that the adjustable structure can make a front-rear position of the first force receiving member 51 relative to the first housing assembly 10 (e.g., a horizontal position along the direction of the adjustable through hole 5121) is adjustable in a certain range. Optionally, positions of the adjustable through hole 5121 and the post 156 can be exchanged, that is, the adjustable through hole 5121 is arranged on the main casing decorating element 15 and the post 156 is arranged on the first force receiving member 51. Of course, the adjustable structure of the present application is not limited to the manner of the adjustable through hole 5121 and the post 156, and any structure that can make the position of the first force receiving member 51 be adjustable relative to the first housing assembly 10 can be adopted.

When a user wears the head-mounted device 100, the strap assembly 20 connects the first housing assembly 10 and the second housing assembly 30 together to form a wearable ring frame, and the second force receiving member 52 and the first housing assembly 10 are configured as main force receiving points. The first housing assembly 10 is in contact with the user's forehead, and the second force receiving member 52 is in contact with the back of the user's head. The user supports the head-mounted device 100 through the forehead and the back of the head. Since the first force receiving member 51 is arranged obliquely toward the second force receiving member 52 above the forehead, and is in contact with the portion above the user's forehead, the head-mounted device 100 can be stably supported, thus allowing the user to wear more comfortably.

The above are preferred embodiments of the present application. It should be noted that for those skilled in the art, some improvements and modifications can be made without departing from the principle of the present application, and these improvements and modifications are also considered to be within the protection scope of the present application.

What is claimed is:

1. A head-mounted device, comprising:
   a housing forming an accommodating chamber;
   a mask, wherein an upper portion of the mask is connected to the housing, and a lower portion of the mask exceeds out of the housing;
   an optical machine assembly comprising:
   an optical machine support arranged in the accommodating chamber;
   an optical machine positioned in the accommodating chamber;
   a waveguide piece; and
   a connecting body positioned in the accommodating chamber, the optical machine and the waveguide piece being mounted on the connecting body, and the connecting body being fixed to the optical machine support;
   wherein the waveguide piece penetrates through a bottom of the housing from the accommodating chamber and extends downwards;
   wherein the optical machine support comprises a first plate, a second plate perpendicularly extending from a side of the first plate, and two legs extending from the first plate and located at two sides of the second plate; the connecting body is connected to the first plate of the optical machine support.

2. The head-mounted device according to claim 1, further comprising a camera assembly, wherein accommodating space is defined between the connecting body and the second plate to accommodate a part of the camera assembly.

3. The head-mounted device according to claim 2, wherein the camera assembly is mounted on the optical machine support.

4. The head-mounted device according to claim 3, wherein the camera assembly comprises a TOF camera, an RGB camera, two fisheye cameras, a first camera stand, and two second camera stands positioned at two opposite sides of the first camera stand respectively; the TOF camera and an RGB camera are fixed on the optical machine support through the first camera stand, the two fisheye cameras are fixed on the optical machine support through the two second camera stands respectively.

5. The head-mounted device according to claim 1, wherein the two legs are connected with the housing.

6. The head-mounted device according to claim 1, wherein a liner is sandwiched between the connecting body and the housing, and the waveguide piece penetrates through the liner.

7. The head-mounted device according to claim 1, further comprising:
a strap assembly comprising:
a headband body being provided with a connecting part, the connecting part being mounted on the housing; and
a first heat sink arranged along the headband body, the first heat sink extending into the accommodating chamber and connected with a second heat sink; wherein the second heat sink is connected to the optical machine.

8. The head-mounted device according to claim 1, wherein the housing comprises:
a first housing comprising:
a top plate; and
a first side plate arranged at a side of the top plate;
a second housing comprising:
a bottom plate arranged to be opposite to the top plate, the bottom plate defining a through hole; and
a second side plate arranged at a side of the bottom plate and arranged to be opposite to the first side plate, wherein the first housing and the second housing are snapped together to form the accommodating chamber.

9. The head-mounted device according to claim 8, further comprising:
a first connection mechanism arranged between the top plate and the second side plate; and
a second connection mechanism arranged between the bottom plate and the first side plate;
wherein the first connection mechanism and the second connection mechanism connect the first housing and the second housing together.

10. The head-mounted device according to claim 9, wherein the first connection mechanism comprises a first snap structure arranged on the top plate and a second snap structure arranged on the second side plate, and the second connection mechanism comprises a third snap structure arranged on the bottom plate and a fourth snap structure arranged on the first side plate.

11. The head-mounted device according to claim 8, further comprising:
a cover plate arranged on the top plate and configured to cover the top plate;
wherein a surface of the cover plate facing the top plate is provided with a post, the top plate defines a through hole, and the post is inserted in the through hole.

12. The head-mounted device according to claim 8, wherein:
the first side plate comprises:
a first portion extending downward from two sides of the top plate;
a connection portion extending from the first portion and away from the second side plate; and
a second portion extending downward from the connection portion;
and the mask comprises:
a mask portion covering on the second portion of the first side plate; and
a first mounting portion, wherein the first mounting portion extends from an edge of the mask portion to a side of the mask portion, and is attached and connected to the connection portion of the first side plate.

13. The head-mounted device according to claim 12, further comprising:
a rear cover, the rear cover being connected with a lower part of the mask and located below the bottom plate;
wherein the rear cover comprises a light-transmitting portion and a second mounting portion, the light-transmitting portion is in correspondence with the mask portion, the second mounting portion is connected with the first mounting portion, and the waveguide piece is located between the light-transmitting portion and the mask portion.

14. The head-mounted device according to claim 1, further comprising a speaker assembly received in the accommodating chamber.

15. The head-mounted device according to claim 14, further comprising a motherboard; wherein the accommodating chamber comprises a first cavity, and a second cavity and a third cavity which are respectively located at two opposite sides of the first cavity; the motherboard is received in the first cavity, and the speaker assembly comprises a first speaker received in the second cavity and a second speaker received in the third cavity.

16. The head-mounted device according to claim 15, further comprising a microphone assembly received in the accommodating chamber.

17. The head-mounted device according to claim 16, wherein the microphone assembly comprises a first microphone supported by or fixed on the first speaker, a second microphone supported by or fixed on the second speaker, and a third microphone and a fourth microphone located below the motherboard.

18. A head-mounted device, comprising:
a first housing, the first housing being provided with a first connecting mechanism;
a second housing, the second housing being provided with a second connecting mechanism engaging with the first connecting mechanism, and the first housing and the second housing being connected together to form an accommodating chamber;
a mask, an upper portion of the mask being connected to the first housing, and a lower portion of the mask exceeding out of a bottom of the second housing; and
an optical machine assembly comprising:
an optical machine support arranged in the accommodating chamber;
an optical machine positioned in the accommodating chamber;
a waveguide piece; and
a connecting body positioned in the accommodating chamber, the optical machine and the waveguide piece being mounted on the connecting body, and the connecting body being fixed to the optical machine support;
wherein the waveguide piece penetrates through the second housing from the accommodating chamber and extends downwards;
wherein the optical machine support comprises a first plate, a second plate perpendicularly extending from a side of the first plate, and two legs extending from the first plate and located at two sides of the second plate; the connecting body is connected to the first plate of the optical machine support.

19. A head-mounted device, comprising:
a housing comprising:
a first housing; and a second housing connected to the first housing to form an accommodating chamber;

a mask, an upper portion of the mask being connected to the first housing, and a lower portion of the mask exceeding out of a bottom of the second housing;

an optical machine positioned in the accommodating chamber;

a waveguide piece, the waveguide piece penetrating through the second housing from the accommodating chamber and extending downwards; and an optical machine support comprising a first plate, a second plate perpendicularly extending from a side of the first plate, and two legs extending from the first plate and located at two sides of the second plate; a connecting body being connected to the first plate of the optical machine support.

* * * * *